US008562152B2

(12) United States Patent
Akiyama

(10) Patent No.: US 8,562,152 B2
(45) Date of Patent: Oct. 22, 2013

(54) COLLIMATOR LENS UNIT WITH ASPHERIC SURFACES FOR IMPARTING A LUMINOUS FLUX DENSITY DISTRIBUTION

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 12/972,762

(22) Filed: Dec. 20, 2010

(65) Prior Publication Data

US 2011/0157566 A1 Jun. 30, 2011

(30) Foreign Application Priority Data

Dec. 24, 2009 (JP) ................................. 2009-291958
Nov. 4, 2010 (JP) ................................. 2010-247149

(51) Int. Cl.
*G03B 21/20* (2006.01)
*G03B 21/26* (2006.01)
*G03B 3/00* (2006.01)
*G03B 9/00* (2006.01)
*G03B 27/30* (2006.01)

(52) U.S. Cl.
USPC ............. 353/94; 353/102; 359/641; 359/649

(58) Field of Classification Search
USPC ............ 353/30–31, 33, 38, 81, 94, 100, 122, 353/102; 359/362, 364–366, 385–387, 649, 359/651–655, 717, 720, 728, 737, 754, 359/793–796, 641–642
See application file for complete search history.

(56) References Cited

U.S. PATENT DOCUMENTS

| 6,236,512 | B1 * | 5/2001 | Nakai ........................... 359/641 |
| 6,688,758 | B2 * | 2/2004 | Thibault ....................... 362/368 |
| 7,258,453 | B2 | 8/2007 | Inamoto |
| 8,213,479 | B2 * | 7/2012 | Doerfel et al. ............. 372/50.12 |
| 2003/0214634 | A1 * | 11/2003 | Akiyama ........................ 353/31 |
| 2004/0227910 | A1 * | 11/2004 | Akiyama et al. .............. 353/102 |
| 2005/0157267 | A1 * | 7/2005 | Akiyama ........................ 353/38 |
| 2010/0271696 | A1 * | 10/2010 | Dohi et al. .................... 359/385 |

FOREIGN PATENT DOCUMENTS

| JM | A-2005-208571 | 8/2005 |
| JP | A-2005-274957 | 10/2005 |

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A collimator lens unit includes at least two lenses and substantially collimates a beam of light emitted from a solid-state light source unit of a Lambert emission type, wherein at least two faces of incidence faces and emission faces of the lenses constituting the two lenses are aspheric faces, one front aspheric face located close to the solid-state light source unit has a function of changing a luminous flux density distribution of the beam of light emitted from the solid-state light source unit to a predetermined luminous flux density distribution in which the luminous flux density in the vicinity of an optical axis of the collimator lens unit is higher than the luminous flux density in a peripheral portion separated from the optical, the rear aspheric face farthest from the solid-state light source unit has a function of substantially collimating the beam of light.

15 Claims, 16 Drawing Sheets

FIG. 3A
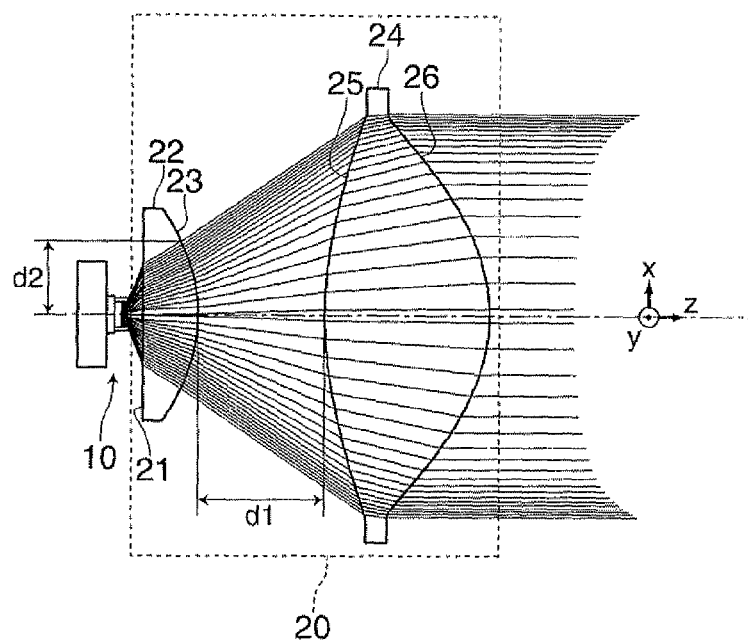
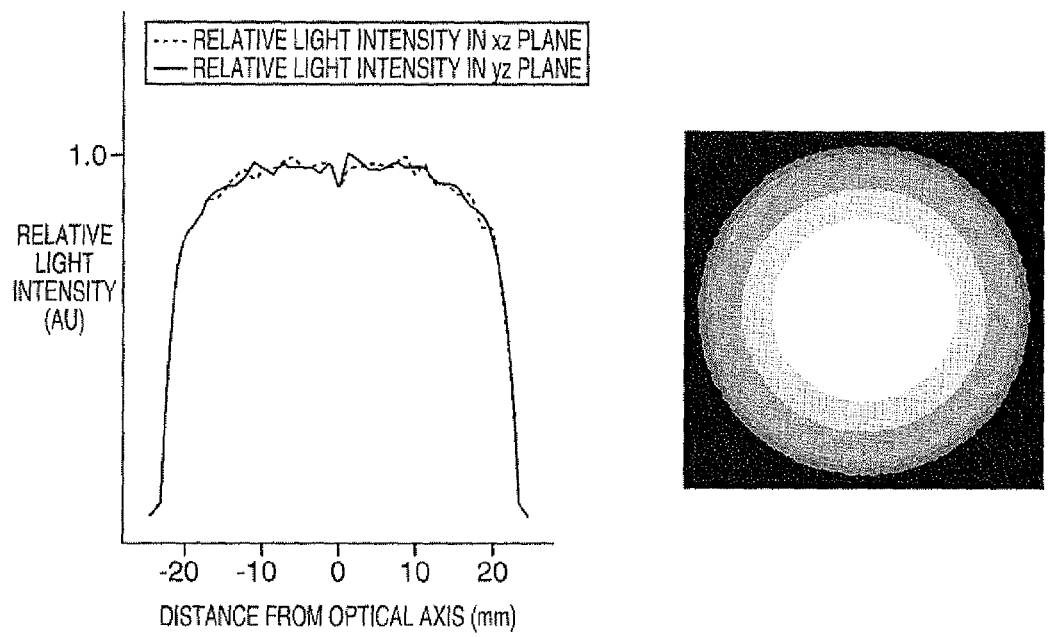
FIG. 3B
FIG. 3C

FIG. 4A
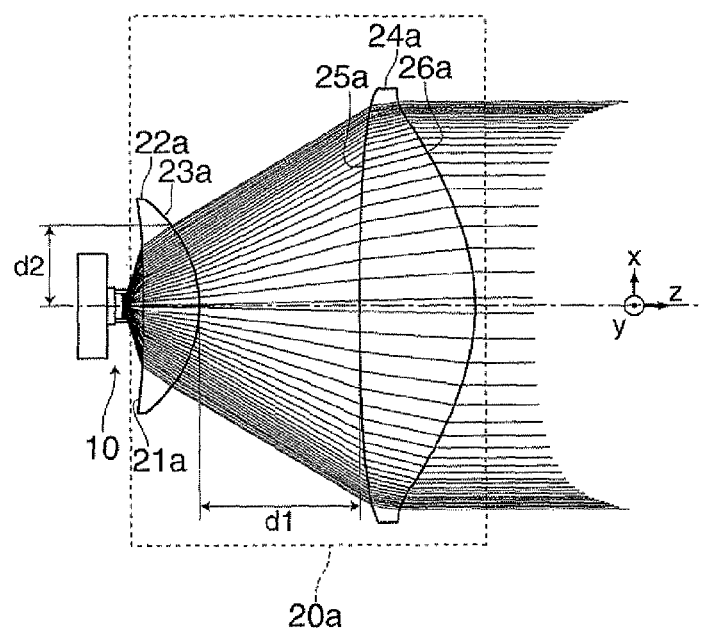
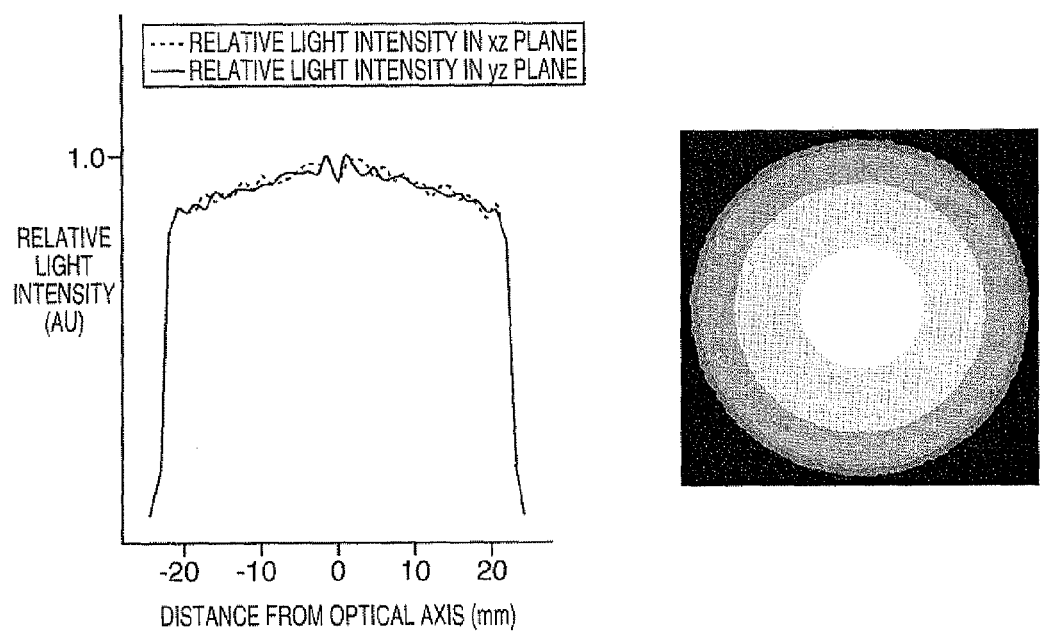
FIG. 4B
FIG. 4C

FIG. 5A
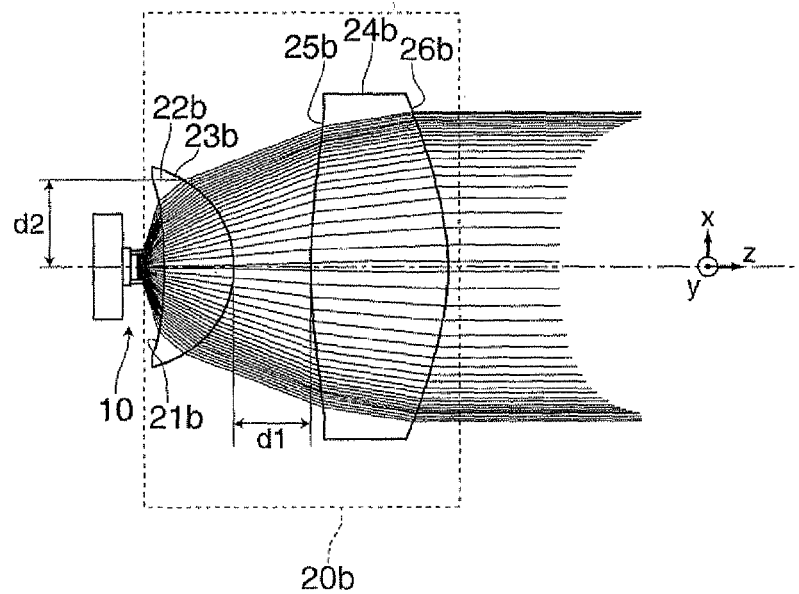
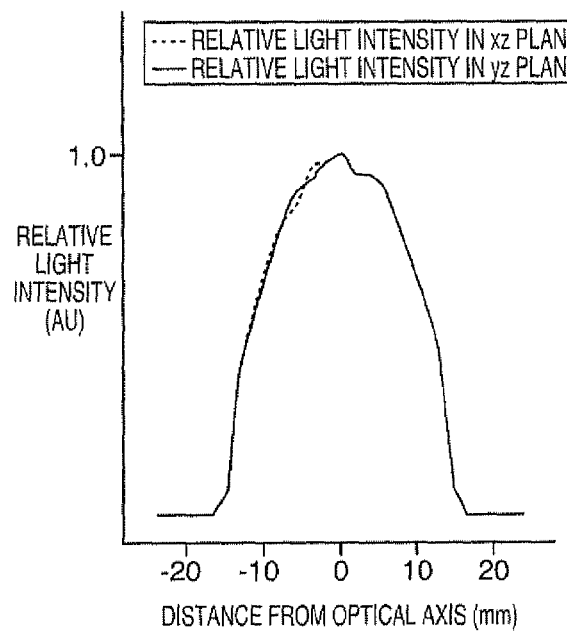
FIG. 5B
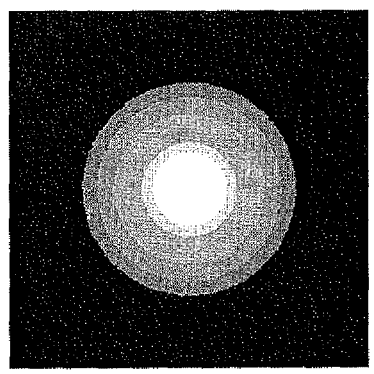
FIG. 5C

FIG. 6A
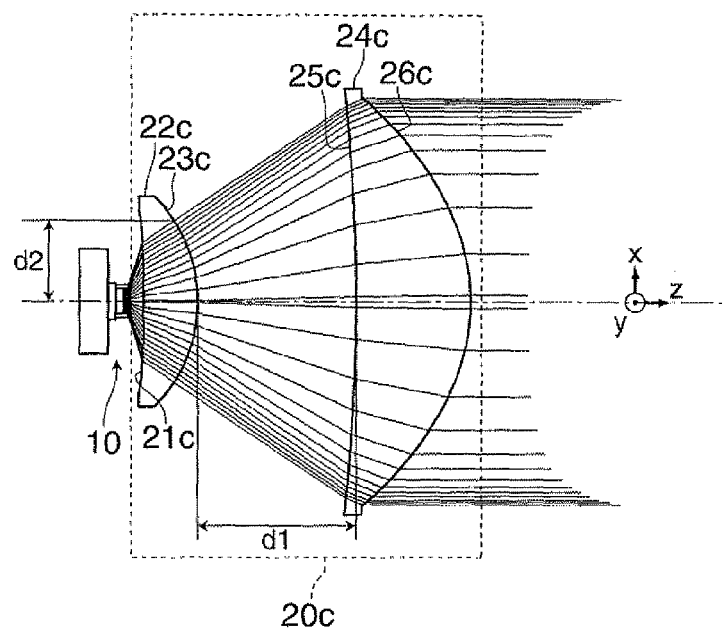
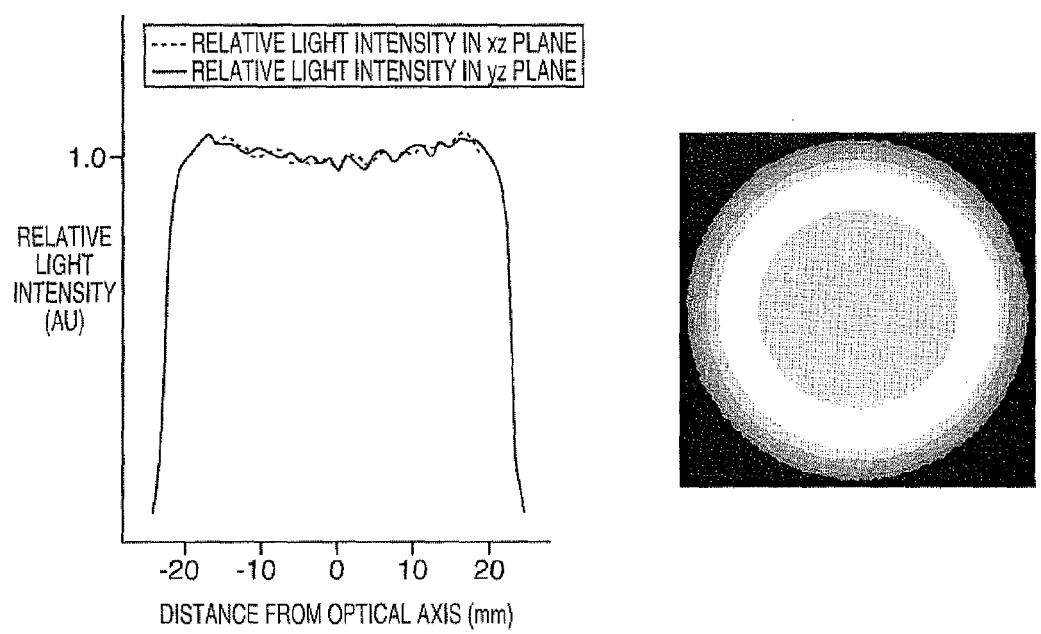
FIG. 6B
FIG. 6C

FIG. 7A
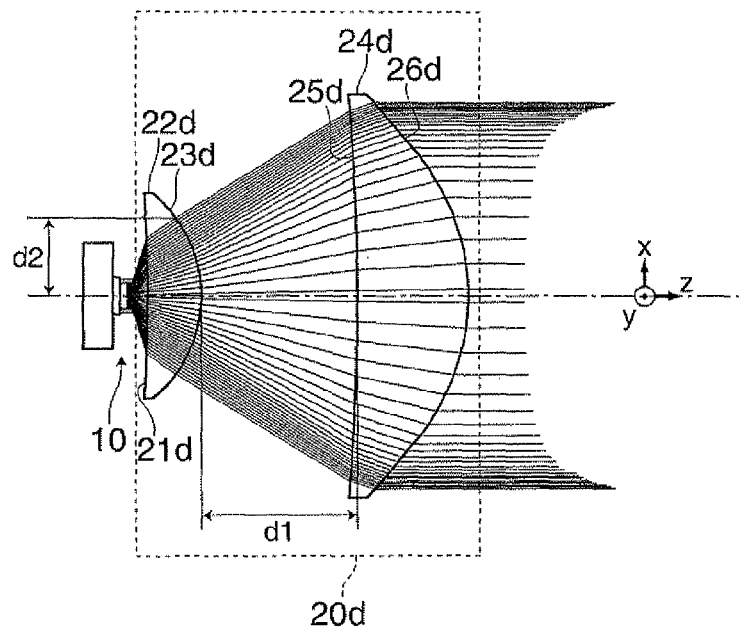
FIG. 7B
FIG. 7C
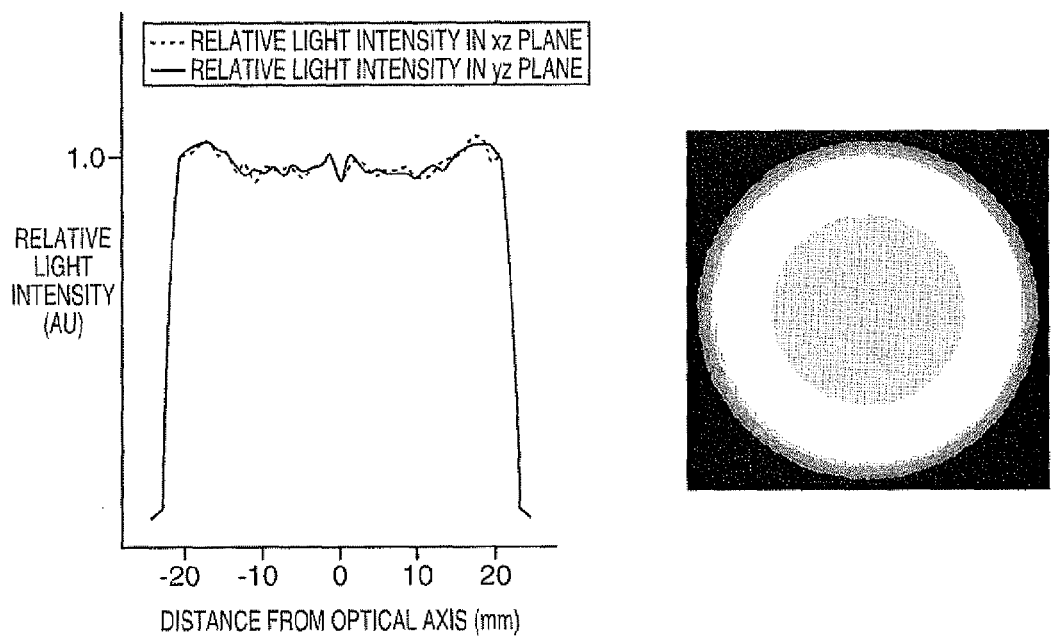

FIG. 8A
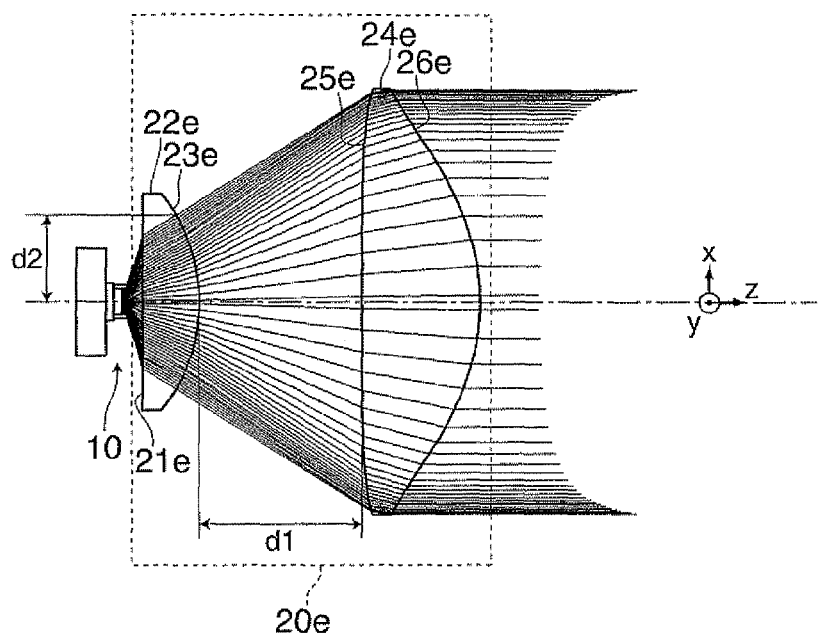
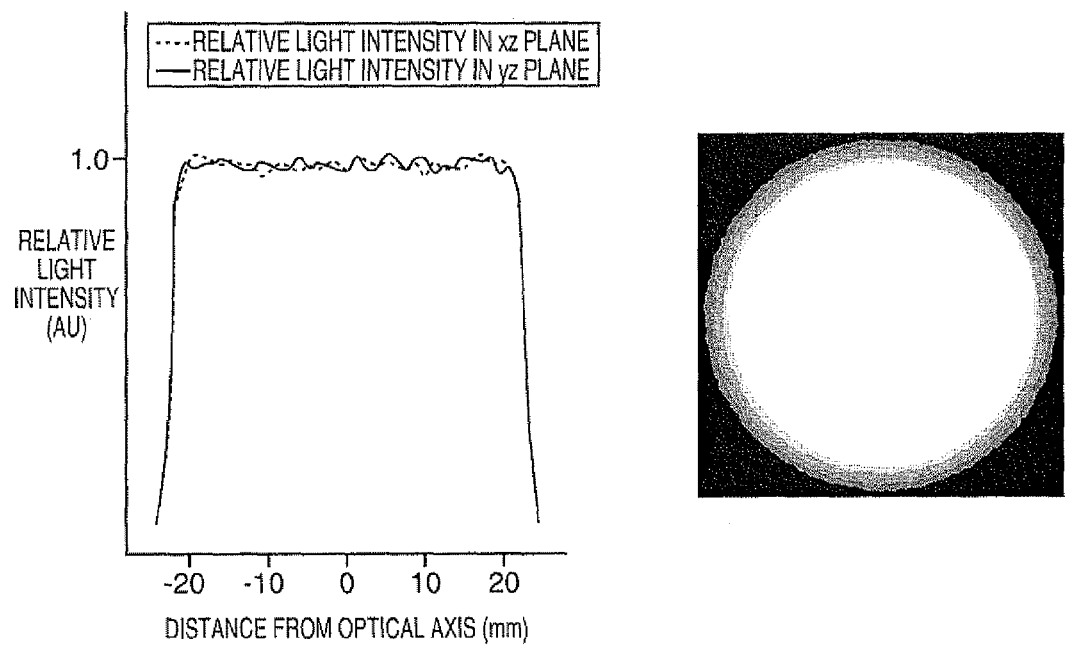
FIG. 8B
FIG. 8C

FIG. 9A
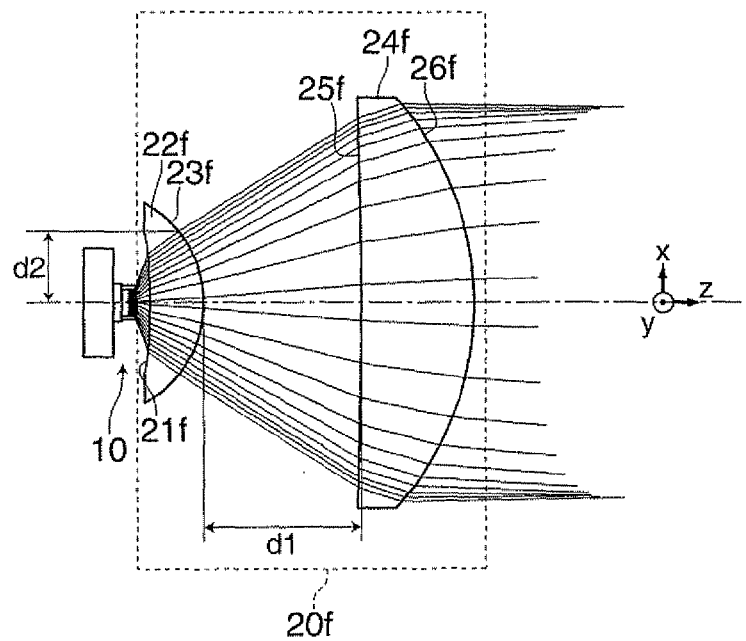
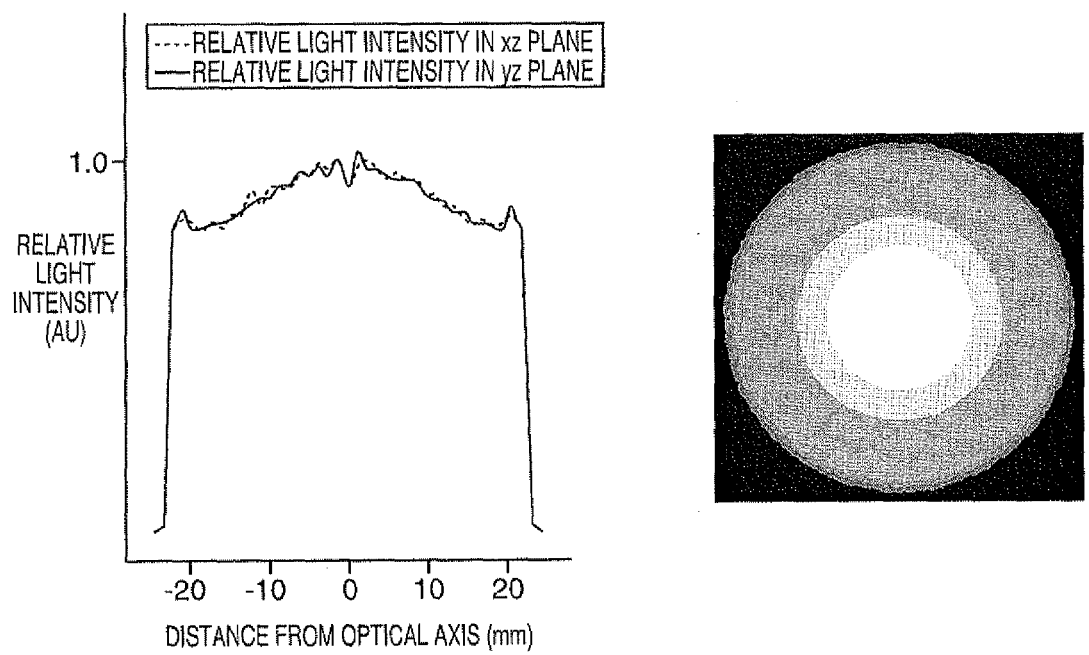
FIG. 9B
FIG. 9C

FIG. 12A
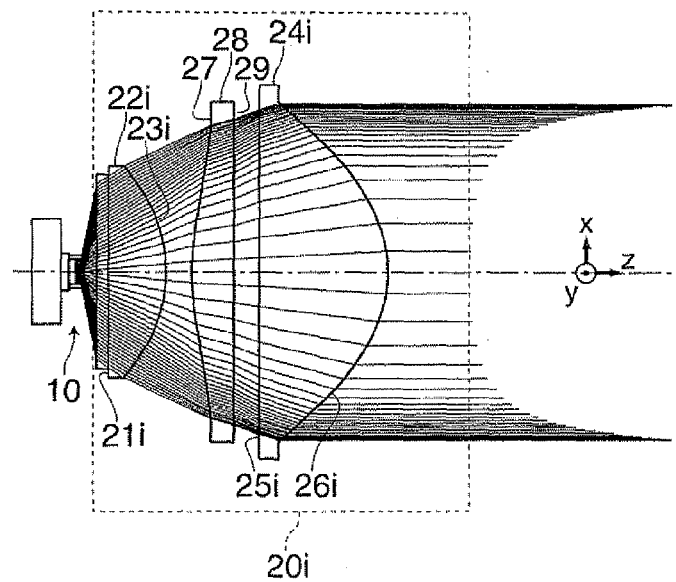
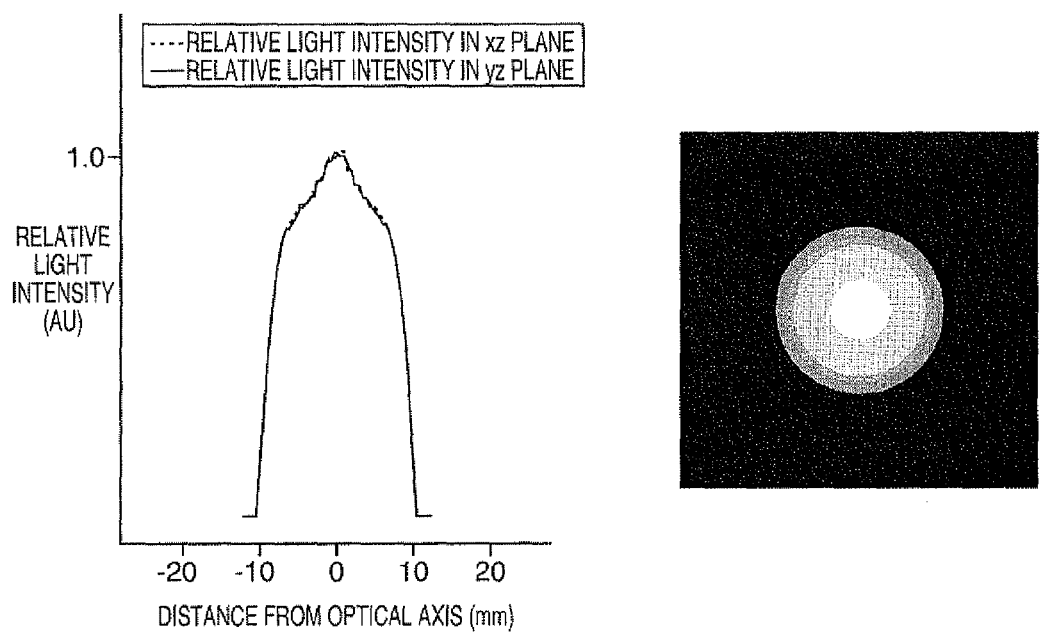
FIG. 12B　　　　　　　FIG. 12C

FIG. 15A
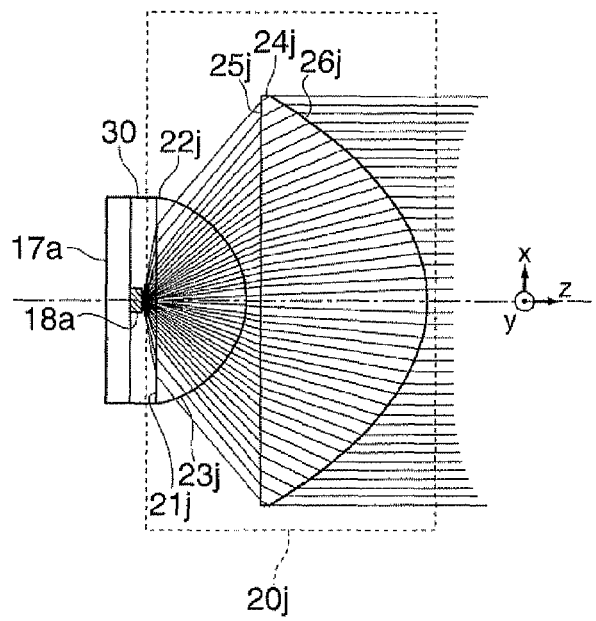
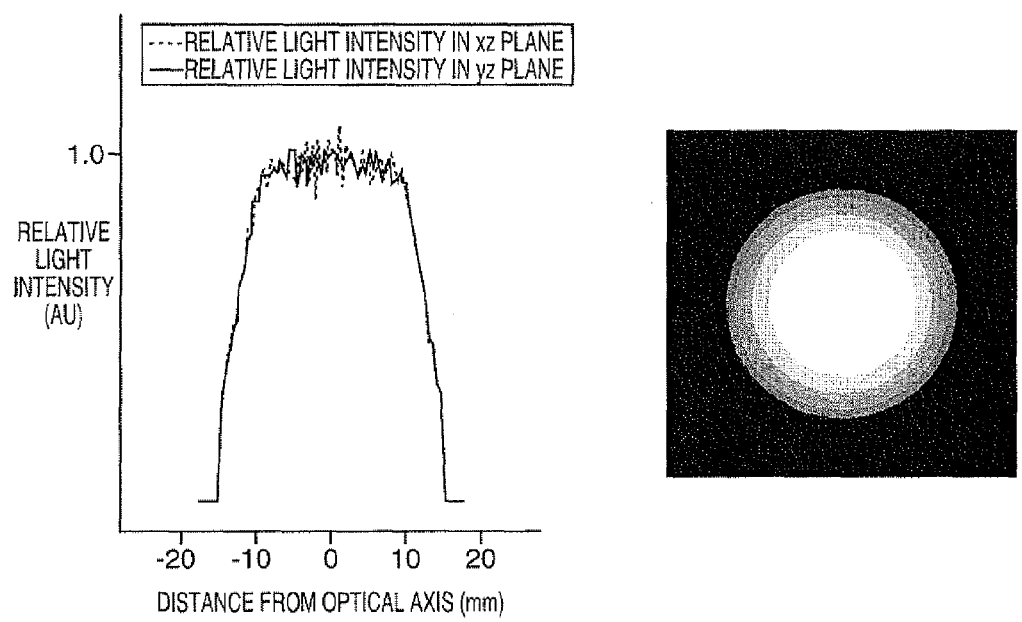
FIG. 15B
FIG. 15C

FIG. 16B                    FIG. 16C

FIG. 17A
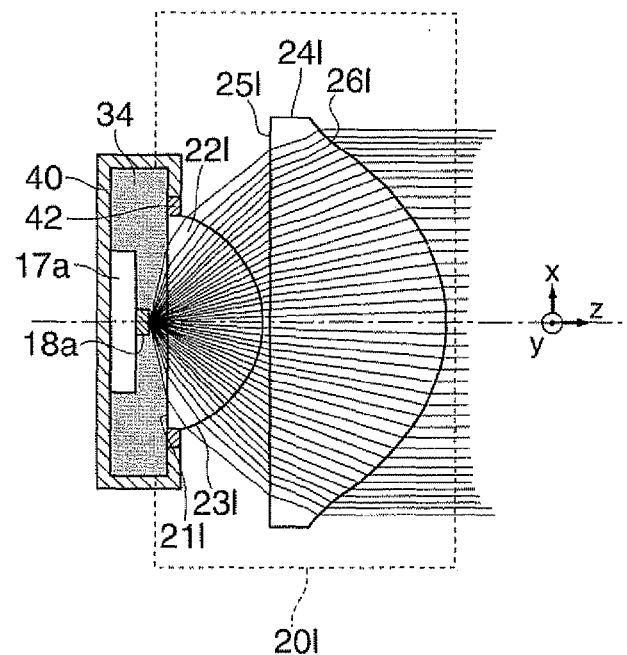
FIG. 17B
FIG. 17C
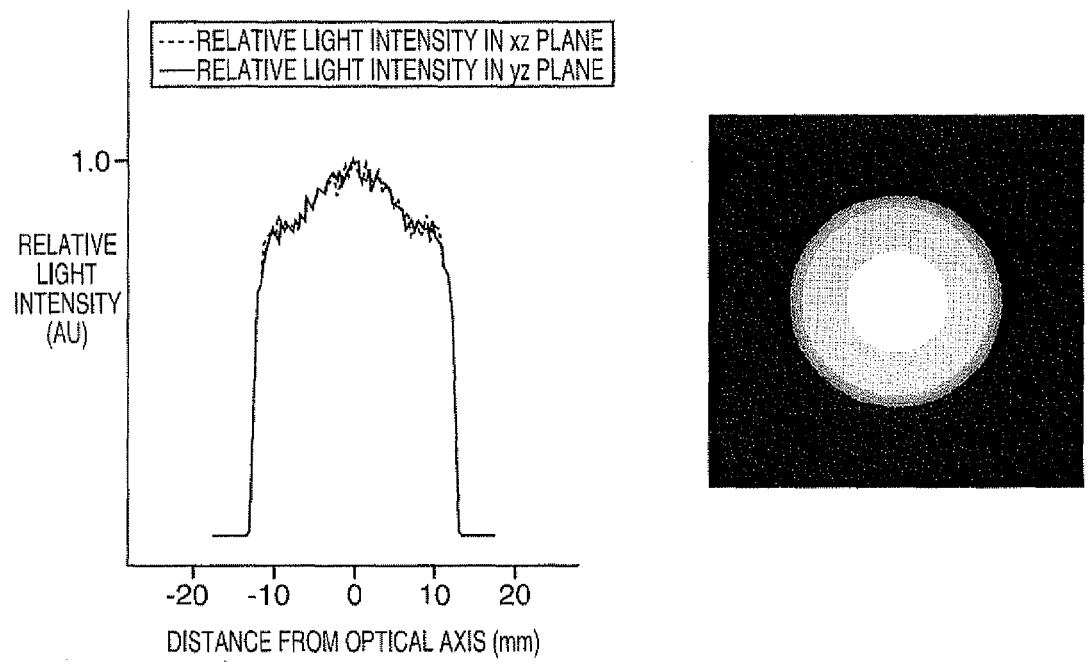

COLLIMATOR LENS UNIT WITH ASPHERIC SURFACES FOR IMPARTING A LUMINOUS FLUX DENSITY DISTRIBUTION

BACKGROUND

1. Technical Field

The present invention relates to a collimator lens unit, an illuminating device, and a projector.

2. Related Art

Hitherto, a collimator lens unit including a first lens suppressing a spread angle of a beam of light emitted from a solid-state light source unit and a second lens substantially collimating the beam of light from the first lens has been known (for example, see JP-A-2005-208571).

Since the collimator lens unit substantially collimates the beam of light, the spread angle of which is suppressed by the first lens, by the use of the second lens, it is possible to efficiently substantially collimate the beam of light emitted from the solid-state light source unit.

On the other hand, a projector employing a white solid-state light source unit including a solid-state light source emitting main exciting light and a fluorescent layer converting and emitting the main exciting light has been known (see JP-A-2005-274957).

Since the projector includes the white solid-state light source unit of a small size and a small weight with small energy consumption, it is possible to construct a projector of a small size and a small weight with small energy consumption.

However, in the projector, the orientation distribution of the beam of light emitted from the solid-state light source unit exhibits a Lambert orientation distribution. Accordingly, when it is intended to apply the collimator lens unit to the projector, the luminous flux density in the vicinity of the optical axis of the collimator lens unit in the beam of light emitted from the collimator lens unit is lower than the luminous flux density in a peripheral portion separated from the optical axis of the collimator lens unit. For this reason, even when an integrator optical system for homogenizing the in-plane light intensity distribution of the beam of light emitted from the collimator lens unit is disposed at the rear stage, the ratio of light applied at a large angle to light applied to an illumination area increases. As a result, in a projector employing particularly a liquid crystal device having a micro lens built therein as an optical modulator, there is a problem in that the light use efficiency decreases due to the increase in ratio of the light applied at a large angle to the light applied to the illumination area.

SUMMARY

An advantage of some aspects of the invention is that it provides a collimator lens unit in which the light use efficiency does not decrease due to the increase in ratio of light applied at a large angle to light applied to an illumination area. Another advantage of some aspects of the invention is that it provides an illuminating device including the collimator lens unit. Another advantage of some aspects of the invention is that it provides a projector including the illuminating device.

1. According to an aspect of the invention, there is provided a collimator lens unit that includes at least two lenses and substantially collimates a beam of light emitted from a solid-state light source unit of a Lambert emission type, wherein at least two faces of incidence faces and emission faces of the lenses constituting the at least two lenses are aspheric faces. Here, at least one front aspheric face located close to the solid-state light source unit out of the at least two aspheric faces has a luminous flux density distribution changing function of changing a luminous flux density distribution of the beam of light emitted from the solid-state light source unit to a predetermined luminous flux density distribution in which the luminous flux density in the vicinity of an optical axis of the collimator lens unit is higher than the luminous flux density in a peripheral portion separated from the optical axis of the collimator lens unit. The rear aspheric face farthest from the solid-state light source unit out of the at least two aspheric faces has a function of substantially collimating the beam of light formed with the predetermined luminous flux density distribution. The luminous flux density in the vicinity of the optical axis of the collimator lens unit in the beam of light emitted from the collimator lens unit is higher than the luminous flux density in a peripheral portion separated from the optical axis of the collimator lens unit.

According to this configuration, since the luminous flux density in the vicinity of the optical axis of the collimator lens unit in the beam of light emitted from the collimator lens unit can be set to be higher than the luminous flux density in the peripheral portion separated from the optical axis of the collimator lens unit, the light use efficiency does not decrease due to the increase in ratio of the light applied at a large angle to light applied to an illumination area.

In the specification, the "luminous flux density" means the light intensity per unit area in the beam of light emitted from the collimator lens unit.

In the collimator lens unit, both the front aspheric face and the rear aspheric face may be a rotationally-symmetric aspheric face in which the position in the optical axis direction in the aspheric face is arbitrarily defined depending on the distance from the optical axis.

2. In the collimator lens unit, the luminous flux density of the beam of light emitted from the collimator lens unit may have the maximum value at the optical axis of the collimator lens unit and may gradually become lower as it moves away from the optical axis of the collimator lens unit.

According to this configuration, the in-plane light intensity distribution in the illumination area can be further homogenized.

3. In the collimator lens unit, the at least two lenses may include a first lens located closer to the solid-state light source unit and a second lens located apart from the solid-state light source unit, the front aspheric face may be formed in the emission face of the first lens or the incidence face of the second lens, and the rear aspheric face may be formed in the emission face of the second lens.

According to this configuration, the luminous flux density in the vicinity of the optical axis of the collimator lens unit out of the luminous flux density of the beam of light emitted from the solid-state light source unit can be reasonably made to satisfactorily be higher than the luminous flux density in the peripheral portion separated from the optical axis of the collimator lens unit.

4. In the collimator lens unit, the emission face of the first lens may be a spherical face, and the front aspheric face may be formed in the incidence face of the second lens.

According to this configuration, since a beam of light with a larger beam diameter can be made to be incident on the front aspheric face in comparison with the case where the front aspheric face is formed in the emission face of the first lens, it is possible to reasonably and precisely change the luminous flux density distribution using the front aspheric face having a large area.

5. In the collimator lens unit, a gap between the first lens and the second lens may be greater than an effective radius of the first lens.

According to this configuration, it is possible to make a beam of light with a satisfactorily enlarged beam diameter be incident on the front aspheric face.

Here, the gap between the first lens and the second lens means a gap between the emission face of the first lens and the incidence face of the second lens along the optical axis of the collimator lens unit. The effective radius of the first lens means a beam diameter of the beam of light from the solid-state light source unit when the beam of light from the solid-state light source unit passes through the emission face of the first lens.

6. In the collimator lens unit, the first lens may be formed of an optical glass and the second lens may be formed of a resin.

When the emission face of the first lens is a spherical face and the incidence face of the second lens is the front aspheric face, it is preferable that the first lens is formed of an optical glass and the second lens is formed of a resin. Accordingly, it is possible to manufacture a collimator lens unit with high mass productivity as a whole by manufacturing the first lens using a known grinding and polishing method and manufacturing the second lens using a press molding method.

7. In the collimator lens unit, nd of the first lens may be equal to or greater than 1.7.

According to this configuration, it is possible to efficiently suppress the spread angle of the beam of light emitted from the solid-state light source unit.

In this specification, "nd" means a refractive index with respect to light with a wavelength of 589.3 nm.

8. In the collimator lens unit, the incidence face of the first lens may be a plane.

According to this configuration, it is possible to manufacture the first lens at a low cost and thus to manufacture the collimator lens unit at a low cost.

9. In the collimator lens unit, the at least two lenses may include a first lens located closer to the solid-state light source unit, a second lens located apart from the solid-state light source unit, and a third lens located between the first lens and the second lens. The front aspheric face may be formed in two faces of the emission face of the first lens, the incidence face and the emission face of the third lens, and the incidence face of the second lens and the rear aspheric face may be formed in the emission face of the second lens.

According to this configuration, the luminous flux density in the vicinity of the optical axis of the collimator lens unit out of the luminous flux density of the beam of light emitted from the solid-state light source unit can also be reasonably made to satisfactorily be higher than the luminous flux density in the peripheral portion separated from the optical axis of the collimator lens unit.

10. According to another aspect of the invention, there is provided an illuminating device including: a solid-state light source unit of a Lambert emission type; and a collimator lens unit that substantially collimates a beam of light emitted from the solid-state light source unit, wherein the collimator lens unit is the above-mentioned collimator lens unit according to the aspect of the invention.

According to this configuration, since the illuminating device includes the collimator lens unit according to the aspect of the invention, the light use efficiency does not decrease due to the increase in ratio of the light applied at a large angle to the light applied to the illumination area.

11. In the illuminating device, the collimator lens unit may be the collimator lens unit according to 1 or 2, and the at least two lenses may include a first lens located closer to the solid-state light source unit and a second lens located apart from the solid-state light source unit. When a portion emitting a beam of light having a Lambert light intensity distribution in the solid-state light source unit is a light-emitting portion, a heat-dissipating member formed of a transparent solid or liquid may be disposed in contact with the light-emitting portion and the first lens in the illuminating device. The front aspheric face may be formed in the emission face of the first lens.

According to this configuration, it is possible to cool the light-emitting portion, which can be easily heated to a high temperature, using the heat-dissipating member and thus to prevent the deterioration of the light-emitting portion, thereby elongating the lifetime of the illuminating device.

According to this configuration, since the heat-dissipating member is disposed in contact with the first lens, only the interface between the heat-dissipating member and the first lens in the optical path from the solid-state light source unit to the first lens can be considered for the refraction of light. Accordingly, it is possible to easily design the illuminating device.

According to this configuration, since the front aspheric face is formed in the emission face of the first lens, it is possible to form coarse and dense portions in the luminous flux emitted from the first lens.

According to this configuration, since the distance from the front aspheric face to the rear aspheric face can increase more in comparison with the case where the front aspheric face is formed in the incidence face of the second lens, it is possible to easily and precisely change the luminous flux density distribution over the greater distance.

The "light-emitting portion" means a portion emitting light having a Lambert light intensity distribution in a solid-state light source unit. Examples of the light-emitting portion include a fluorescent layer generating and emitting fluorescent light from exciting light and a spread plate changing and emitting incident light into light having the Lambert light intensity distribution. Since the fluorescent layer greatly decreases in light conversion efficiency at a high temperature, the above-mentioned configuration is particularly effective in the configuration where the fluorescent layer is used as the light-emitting portion.

A member with high thermal conductivity can be preferably used as the heat-dissipating member from the viewpoint of cooling the light-emitting portion. A member with high transparency can be preferably used from the viewpoint of light use efficiency. A solid such as sapphire, spinel, quartz glass, and optical glass or a liquid including water or coolant transmitting visible light can be used as the heat-dissipating member.

12. In the illuminating device according to 11, the front aspheric face may be an ellipse-approximating curve of which the minor axis is parallel to the optical axis.

According to this configuration, the luminous flux density in the vicinity of the optical axis of the collimator lens unit out of the luminous flux density of the beam of light emitted from the solid-state light source unit can be made to be satisfactorily higher than the luminous flux density in the peripheral portion separated from the optical axis of the collimator lens unit.

In this specification, the "ellipse-approximating curve" includes both an ellipse and a curve approximating to the ellipse.

13. In the illuminating device according to 11 or 12, when nd of the heat-dissipating member is n1 and nd of the first lens is n2, a condition of "$n2-n1 \geq 0.2$" may be satisfied.

According to this configuration, it is possible to satisfactorily refract the beam of light in the interface between the heat-dissipating member and the first lens.

It is more preferable that a condition of "n2−n1≥0.3" is satisfied. As the difference between the nd of the heat-dissipating member and the nd of the first lens increases, the beam of light can be more strongly refracted in the interface between the heat-dissipating member and the first lens and the interface between the emission face of the first lens and air. Accordingly, the first lens is not enlarged more than needed.

Examples of the combination of the "material of the heat-dissipating member" and the "material of the first lens" satisfying the condition of "n2−n1≥0.2" include a combination of sapphire (with nd=1.71) and high-refractive optical glass (with nd=2.0 or more, A-NBA20 made by Asahi Glass Co., Ltd. or L-BBH1 made by Ohara Inc.), a combination of water (with nd=1.333) and high-refractive optical glass (with nd=1.6 or more, S-LAL7 made by Ohara Inc.), and a combination of quartz glass or white glass (with nd=about 1.5) and high-refractive optical glass (with nd=1.75 or more, S-LAH59 made by Ohara Inc.). In the aspect of the invention, the combination of the "material of the heat-dissipating member" and the "material of the first lens" is not limited to these examples.

14. In the illuminating device according to any one of 11 to 13, the heat-dissipating member may be formed of a solid, a face of the heat-dissipating member in contact with the incidence face of the first lens may be a plane, and the incidence face of the first lens may be a plane.

According to this configuration, it is possible to manufacture the heat-dissipating member and the first lens at a low cost, thereby lowering the manufacturing cost of the illuminating device.

According to this configuration, it is possible to easily bring the heat-dissipating member into close contact with the first lens and thus to lower the manufacturing cost of the illuminating device from this point of view as well.

15. According to still another aspect of the invention, there is provided a projector including an illuminating device, an optical modulator that modulates illuminating light from the illuminating device on the basis of image information, and a projection optical system that projects the modulated light from the optical modulator as a projection image, wherein the illuminating device is the above-mentioned illuminating device according to the aspect of the invention.

According to this configuration, it is possible to provide a projector with a high light use efficiency in which the light use efficiency does not decrease due to the increase in ratio of the light applied at a large angle to the light applied to the illumination area.

BRIEF DESCRIPTION OF THE DRAWINGS

The invention will be described with reference to the accompanying drawings, wherein like numbers reference like elements.

FIGS. 3A to 3C are diagrams illustrating a collimator lens unit according to the first embodiment.

FIGS. 4A to 4C are diagrams illustrating a collimator lens unit according to a second embodiment of the invention.

FIGS. 5A to 5C are diagrams illustrating a collimator lens unit according to a third embodiment of the invention.

FIGS. 6A to 6C are diagrams illustrating a collimator lens unit according to a first comparative example.

FIGS. 7A to 7C are diagrams illustrating a collimator lens unit according to a second comparative example.

FIGS. 8A to 8C are diagrams illustrating a collimator lens unit according to a third comparative example.

FIGS. 9A to 9C are diagrams illustrating a collimator lens unit according to a fourth comparative example.

FIGS. 12A to 12C are diagrams illustrating a collimator lens unit according to a sixth embodiment of the invention.

FIGS. 15A to 15C are diagrams illustrating a collimator lens unit and an illuminating device (in which reference numerals are not shown) according to the seventh embodiment.

FIGS. 16A to 16C are diagrams illustrating a collimator lens unit and an illuminating device (in which reference numerals are not shown) according to an eighth embodiment of the invention.

FIGS. 17A to 17C are diagrams illustrating a collimator lens unit and an illuminating device (in which reference numerals are not shown) according to a ninth embodiment of the invention.

DESCRIPTION OF EXEMPLARY EMBODIMENTS

Hereinafter, a collimator lens unit, an illuminating device, and a projector according to embodiments of the invention will be described with reference to the accompanying drawings.

First Embodiment

First, the configurations of a collimator lens unit 20, an illuminating device 100, and a projector 1000 according to a first embodiment of the invention will be described.

Figure 1:
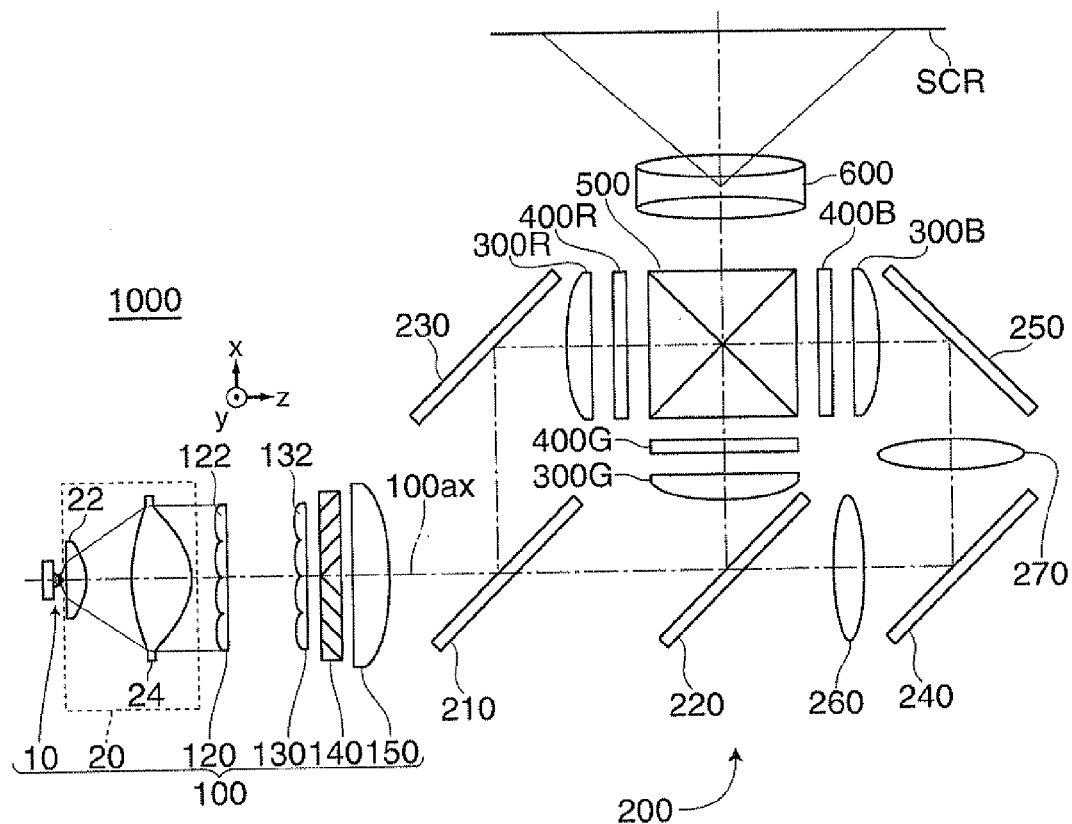
FIG. 1 is a plan view illustrating an optical system of a projector according to a first embodiment of the invention.
Figure 2:
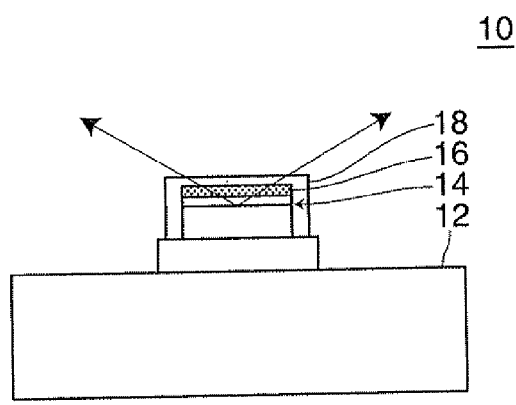
FIG. 2 is a sectional view illustrating a solid-state light source unit according to the first embodiment.

FIG. 1 is a plan view illustrating an optical system of the projector 1000 according to the first embodiment of the invention. FIG. 2 is a sectional view illustrating a solid-state light source unit 10 according to the first embodiment. FIGS. 3A to 3C are diagrams illustrating the collimator lens unit 20 according to the first embodiment. FIG. 3A illustrates a state where a beam of light emitted from the solid-state light source unit 10 is substantially collimated by the collimator lens unit 20, FIG. 3B is a graph illustrating a relative light intensity (relative luminous flux density) of a beam of light emitted from the collimator lens unit 20, and FIG. 3C illustrates an in-plane light intensity distribution (luminous flux density distribution) of the beam of light emitted from the collimator lens unit 20. The beam of light shown in FIG. 3A shows a state where the beam of light emitted from the solid-state light source unit 10 is substantially collimated by the collimator lens unit 20, but does not reflect the luminous flux density. In FIG. 3B, the vertical axis represents the relative light intensity of the beam of light emitted from the collimator lens unit 20, where the light intensity in an optical axis is set to 1. The horizontal axis represents a distance from the optical axis.

In the following description, it is assumed that three directions perpendicular to each other are a z axis direction (the direction of an illumination optical axis $100ax$ in FIG. 1), an x axis direction (direction parallel to the paper surface of FIG. 1 and perpendicular to the z axis), and an y axis direction (direction perpendicular to the paper surface of FIG. 1 and perpendicular to the z axis).

As shown in FIG. 1, the projector 1000 according to the first embodiment includes an illuminating device 100, a color-separating and light-guiding optical system 200, three liquid crystal devices 400R, 400G, and 400B as optical modulators, a cross dichroic prism 500, and a projection optical system 600.

The illuminating device 100 includes a solid-state light source unit 10, a collimator lens unit 20, a first lens array 120, a second lens array 130, a polarization changing element 140, and a superposing lens 150.

As shown in FIG. 2, the solid-state light source unit 10 is a light-emitting diode of a Lambert emission type including a pedestal 12, a solid-state light source 14, a fluorescent layer 16, and a sealing member 18, and emits white light including read light, green light, and blue light. The solid-state light source unit 10 includes lead lines and the like in addition to the above-mentioned elements, which will not be shown and described.

As shown in FIG. 1 and FIG. 3A, the collimator lens unit 20 is a collimator lens unit including a first lens 22 located close to the solid-state light source unit 10 and a second lens 24 located separated from the solid-state light source unit 10 and substantially collimating a beam of light emitted from the solid-state light source unit of a Lambert emission type, and has a function of converting the beam of light from the solid-state light source unit 10 into a beam of light of which the luminous flux density in the vicinity of the optical axis of the collimator lens unit 20 is higher than the luminous flux density in a peripheral portion separated from the optical axis of the collimator lens unit 20 and emitting the resultant beam of light. The luminous flux density of the beam of light emitted from the collimator lens unit 20 has the maximum value in the optical axis of the collimator lens unit 20 and gradually decreases as it goes farther from the optical axis of the collimator lens unit 20.

Here, the "gradually decrease" means to monotonously and continuously decrease.

The gap d1 between the first lens 22 and the second lens 24 in the collimator lens unit 20 is greater than an effective radius d2 of the first lens 22.

The first lens 22 is a plano-convex lens of which an incidence face 21 is a plane and an emission face 23 is a spherical face and which is formed of an optical glass, and has a function of suppressing an spread angle of the beam of light from the solid-state light source unit 10. Here, nd of the first lens 22 is 1.83.

The second lens 24 is an aspheric double-convex lens in which a front aspheric face is formed in an incidence face 25 and a rear aspheric face is formed in an emission face 26 and which is formed of a resin (PMMA (with nd=1.494)). The incidence face (front aspheric face) 25 has a luminous flux density distribution changing function of changing the luminous flux density distribution of the beam of light emitted from the solid-state light source unit 10 to a predetermined luminous flux density distribution in which the luminous flux density in the vicinity of the optical axis of the collimator lens unit 20 is higher than the luminous flux density in the peripheral portion separated from the optical axis of the collimator lens unit 20, and the emission face (rear aspheric face) 26 has a function of substantially collimating the beam of light with the predetermined luminous flux density distribution. As a result, as shown in FIGS. 3B and 3C, regarding the beam of light emitted from the collimator lens unit 20, the luminous flux density in the vicinity of optical axis of the collimator lens unit 20 is higher than the luminous flux density in the peripheral portion separated from the optical axis of the collimator lens unit 20, has the maximum value in the optical axis of the collimator lens unit 20, and gradually decreases it goes farther from the optical axis of collimator lens unit 20.

The first lens array 120 has a function of a luminous flux dividing optical element of dividing the beam of light from the collimator lens unit 20 into plural luminous fluxes and has a configuration in which plural first micro lenses 122 are arranged in a plane perpendicular to the illumination optical axis $100ax$ in a matrix shape of plural rows and plural columns. Although not shown and described, the outer shape of the first micro lenses 122 is similar to the outer shapes of an image forming area of the liquid crystal devices 400R, 400G, and 400B.

The second lens array 130 has a function of forming the images of the first micro lenses 122 of the first lens array 120 on the vicinity of the image forming areas of the liquid crystal devices 400R, 400G, and 400B in cooperation with the superposing lens 150. The second lens array 130 has substantially the same configuration of the first lens array 120, where plural second micro lenses 132 are arranged in a plane perpendicular to the illumination optical axis $100ax$ in a matrix shape of plural rows and plural columns.

The polarization changing element 140 is a polarization changing element for emitting a beam of linearly-polarized light in which polarization directions of partial luminous fluxes divided by the first lens array 120 are changed to an about one kind of polarization direction.

The polarization changing element 140 includes a polarization separating layer transmitting one linearly-polarized component out of the polarized components included in the illuminating luminous fluxes from the solid-state light source unit 10 and reflecting the other linearly-polarized component in the direction perpendicular to the illumination optical axis $100ax$, a reflecting layer reflecting the other linearly-polarized component reflected by the polarization separating layer in the direction parallel to the illumination optical axis $100ax$, and a retardation film converting the one linearly-polarized component transmitted by the polarization separating layer into the other linearly-polarized component.

The superposing lens 150 is an optical element used to collect and superpose plural partial luminous fluxes passing through the first lens array 120, the second lens array 130, and the polarization changing element 140 on the vicinity of the image forming areas of the liquid crystal devices 400R, 400G, and 400B. The superposing lens 150 is disposed so that the optical axis of the superposing lens 150 is substantially equal to the illumination optical axis $100ax$ of the illuminating device 100. The superposing lens 150 may be formed as a complex lens in which plural lenses are combined.

The color-separating and light-guiding optical system 200 includes dichroic mirrors 210 and 220, reflecting mirrors 230, 240, and 250, an incident lens 260, and a relay lens 270. The color-separating and light-guiding optical system 200 has a function of separating the illuminating light from the illuminating device 100 into three color light components of a red component, a green component, and a blue component and guiding the color light components to three liquid crystal devices 400R, 400G, and 400B as illumination targets.

Collecting lenses 300R, 300G, and 300B are disposed in front of the liquid crystal devices 400R, 400G, and 400B in the optical paths, respectively.

The liquid crystal devices 400R, 400G, and 400B serve to modulate the illuminating light on the basis of image information and serve as illumination targets of the illuminating device 100.

The liquid crystal devices 400R, 400G, and 400B are formed by sealing a liquid crystal as an electro-optical material between a pair of transparent glass substrates, and modulate the polarization direction of one kind of linearly-polarized light emitted from the incident polarizing plate on the basis of the given image information, for example, using a poly-silicon TFT as a switching element.

Although not shown, incident polarizing plates are interposed between the collecting lenses 300R, 300G, and 300B and the liquid crystal devices 400R, 400G, and 400B, and emission polarizing plates are interposed between the liquid crystal devices 400R, 400G, and 400E and the cross dichroic prism 500. The incident color light components are modulated by the incident polarizing plates, the liquid crystal devices 400R, 400G, and 400B, and the emission polarizing plates.

The cross dichroic prism 500 is an optical element for synthesizing the modulated optical images of the color components emitted from the emission polarizing plates to form a color image. The cross dichroic prism 500 has a substantially rectangular shape in a plan view in which four rectangular prisms are coupled, and multi-layered dielectric films are formed in X-shaped interfaces of the rectangular prisms coupled to each other. The multi-layered dielectric film formed in one X-shaped interface serves to reflect the red light component and the multi-layered dielectric film formed in the other interface serves to reflect the blue light component. The red light component and the blue light component are bent by the multi-layered dielectric films and are gathered in the traveling direction of the green light component, whereby three color light components are synthesized.

The color image emitted from the cross dichroic prism 500 is enlarged and projected by the projection optical system 600 to form an image on a screen SCR.

Advantages of the collimator lens unit 20, the illuminating device 100, and the projector 1000 according to the first embodiment of the invention will be described.

In the collimator lens unit 20 according to the first embodiment, the front aspheric face formed in the incidence face 25 of the second lens 24 has a function of converting the beam of light from the solid-state light source unit 10 into a beam of light in which the luminous flux density in the vicinity of the optical axis of the collimator lens unit 20 is higher than the luminous flux density in the peripheral portion separated from the optical axis of the collimator lens unit 20 and emitting the resultant beam of light. Regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area.

In the collimator lens unit 20 according to the first embodiment, since the luminous flux density of the beam of light emitted from the collimator lens unit 20 has the maximum value in the optical axis of the collimator lens unit 20 and gradually decreases as it goes apart from the optical axis of the collimator lens unit 20, it is possible to further homogenize the in-plane light intensity distribution in the illumination area.

Since the collimator lens unit 20 according to the first embodiment includes the first lens 22 located close to the solid-state light source unit 10 and the second lens 24 located apart from the solid-state light source unit 10, the front aspheric face is formed in the incidence face 25 of the second lens 24, and the rear aspheric face is formed in the emission face 26, the luminous flux density in the vicinity of the optical axis of the collimator lens unit out of the luminous flux density of the beam of light emitted from the solid-state light source can be easily made to satisfactorily be higher than the luminous flux density in the peripheral portion separated from the optical axis of the collimator lens unit.

In the collimator lens unit 20 according to the first embodiment, the emission face 23 of the first lens 22 is formed of a spherical face and the incidence face 25 of the second lens 24 is formed of a front aspheric face. Accordingly, since the beam of light with a larger beam diameter can be made to be incident on the front aspheric face in comparison with the case where the front aspheric face is formed in the emission face of the first lens, it is possible to reasonably and precisely change the luminous flux density distribution using the front aspheric face having a large area.

In the collimator lens unit 20 according to the first embodiment, since the gap d1 between the first lens 22 and the second lens 24 in the collimator lens unit 20 is greater than the effective radius d2 of the first lens 22, it is possible to make the beam of light with a satisfactorily increased beam diameter be incident on the front aspheric face.

In the collimator lens unit 20 according to the first embodiment, since the emission face 23 of the first lens 22 is formed of a spherical face and the incidence face 25 of the second lens 24 is formed of the front aspheric face, it is possible to form the first lens out of an optical glass and to form the second lens out of a resin. Accordingly, by forming the first lens using a general grinding and polishing method and forming the second lens using a press molding method, it is possible to manufacture the collimator lens unit with high mass productivity as a whole.

In the collimator lens unit 20 according to the first embodiment, since the nd of the first lens 22 is equal to or more than 1.7, it is possible to efficiently suppress the spread angle of the beam of light emitted from the solid-state light source.

In the collimator lens unit 20 according to the first embodiment, since the incidence face 21 of the first lens 22 is a plane, it is possible to reduce the cost of the first lens, thereby reducing the manufacturing cost of the collimator lens unit.

Since the illuminating device 100 according to the first embodiment includes the solid-state light source unit 10 of a Lambert emission type and the collimator lens unit 20 according to the first embodiment substantially collimating the beam of light emitted from the solid-state light source unit 10, the light use efficiency does not decrease due to the increase in ratio of the beam of light applied at a large angle to the beam of light applied to the illumination area.

Since the projector 1000 according to the first embodiment includes the illuminating device 100 according to the first embodiment, it is possible to provide a projector with a high light use efficiency in which the light use efficiency does not decrease due to the increase in ratio of the beam of light applied at a large angle to the beam of light applied to the illumination area.

Second Embodiment

FIGS. 4A to 4C are diagrams illustrating the collimator lens unit 20a according to the second embodiment. FIG. 4A illustrates a state where a beam of light emitted from the solid-state light source unit 10 is substantially collimated by the collimator lens unit 20*a*, FIG. 4B is a graph illustrating a relative light intensity (relative luminous flux density) of a beam of light emitted from the collimator lens unit 20*a*, and FIG. 4C illustrates an in-plane light intensity distribution (luminous flux density distribution) of the beam of light emitted from the collimator lens unit 20*a*. The beam of light shown in FIG. 4A shows a state where the beam of light emitted from the solid-state light source unit 10 is substantially collimated by the collimator lens unit 20*a*, but does not reflect the luminous flux density. In FIG. 4B, the vertical axis represents the relative light intensity of the beam of light emitted from the collimator lens unit 20*a*, where the light intensity in an optical axis is set to 1. The horizontal axis represents a distance from the optical axis.

The collimator lens unit 20*a* according to the second embodiment of the invention basically has the same configuration as the collimator lens unit 20 according to the first embodiment, but is different from the collimator lens unit 20 according to the first embodiment in the configuration of the first lens constituting the collimator lens unit 20*a*. The configuration of the second lens is different based on the difference of the configuration of the first lens.

That is, in the collimator lens unit 20*a* according to the second embodiment, the first lens 22*a* is formed of a convex meniscus lens, as shown in FIG. 4A. Accordingly, the shapes of the incidence face (front aspheric face) 25*a* and the emission face (rear aspheric face) 26*a* of the second lens 24*a* are different from those of the collimator lens unit 20 according to the first embodiment.

In this way, the collimator lens unit 20*a* according to the second embodiment is different from the collimator lens unit 20 according to the first embodiment, in the configuration of the first lens 22*a* and the configuration of the second lens 24*a*, but the front aspheric face formed in the incidence face 25*a* of the second lens 24*a* has a function of converting the beam of light from the solid-state light source unit 10 into a beam of light in which the luminous flux density in the vicinity of the optical axis of the collimator lens unit 20*a* is higher than the luminous flux density in the peripheral portion separated from the optical axis of the collimator lens unit 20*a* and emitting the resultant beam of light. Accordingly, as shown in FIGS. 4B and 4C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20 according to the first embodiment.

Third Embodiment

FIGS. 5A to 5C are diagrams illustrating the collimator lens unit 20*b* according to the third embodiment. FIG. 5A illustrates a state where a beam of light emitted from the solid-state light source unit 10 is substantially collimated by the collimator lens unit 20*b*, FIG. 5B is a graph illustrating a relative light intensity (relative luminous flux density) of a beam of light emitted from the collimator lens unit 20*b*, and FIG. 5C illustrates an in-plane light intensity distribution (luminous flux density distribution) of the beam of light emitted from the collimator lens unit 20*b*. The beam of light shown in FIG. 5A shows a state where the beam of light emitted from the solid-state light source unit 10 is substantially collimated by the collimator lens unit 20*b*, but does not reflect the luminous flux density. In FIG. 5B, the vertical axis represents the relative light intensity of the beam of light emitted from the collimator lens unit 20*b*, where the light intensity in an optical axis is set to 1. The horizontal axis represents a distance from the optical axis.

The collimator lens unit 20*b* according to the third embodiment of the invention basically has the same configuration as the collimator lens unit 20*a* according to the second embodiment, but is different from the collimator lens unit 20*a* according to the second embodiment in the configuration of the first lens constituting the collimator lens unit 20*b*. The configuration of the second lens is different based on the difference of the configuration of the first lens.

That is, in the collimator lens unit 20*b* according to the third embodiment, the first lens 22*b* is formed of a convex meniscus lens in which an aspheric face is formed in the emission face 23*b*, as shown in FIG. 5A. Accordingly, the shapes of the incidence face (front aspheric face) 25*b* and the emission face (rear aspheric face) 26*b* of the second lens 24*b* are different from those of the collimator lens unit 20*a* according to the second embodiment.

In this way, the collimator lens unit 20*b* according to the third embodiment is different from the collimator lens unit 20*a* according to the second embodiment, in the configuration of the first lens 22*b* constituting the collimator lens unit 20*b*, but the aspheric face formed in the emission face 23*b* of the first lens 22*b* and the front aspheric face formed in the incidence face 25*b* of the second lens 24*b* have a function of converting the beam of light from the solid-state light source unit 10 into a beam of light in which the luminous flux density in the vicinity of the optical axis of the collimator lens unit 20*b* is higher than the luminous flux density in the peripheral portion separated from the optical axis of the collimator lens unit 20*b* and emitting the resultant beam of light. Accordingly, as shown in FIGS. 5B and 5C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20*a* according to the second embodiment.

In the collimator lens unit 20*b* according to the third embodiment, since the aspheric face is formed in the emission face 23*b* of the first lens 22*b*, it is possible to reduce the length of the optical path of the collimator lens unit 20*b* and thus to reduce the size of the collimator lens unit 20*b*.

Collimator lens units according to comparative examples of the invention will be described below.

Comparative Example 1

FIGS. 6A to 6C are diagrams illustrating the collimator lens unit 20*c* according to Comparative Example 1. FIG. 6A illustrates a state where a beam of light emitted from the solid-state light source unit 10 is substantially collimated by the collimator lens unit 20*c*, FIG. 6B is a graph illustrating a relative light intensity (relative luminous flux density) of a beam of light emitted from the collimator lens unit 20*c*, and FIG. 6C illustrates an in-plane light intensity distribution (luminous flux density distribution) of the beam of light emitted from the collimator lens unit 20*c*. The beam of light shown in FIG. 6A shows a state where the beam of light emitted from the solid-state light source unit 10 is substantially collimated by the collimator lens unit 20c, but does not reflect the luminous flux density. In FIG. 6B, the vertical axis represents the relative light intensity of the beam of light emitted from the collimator lens unit 20c, where the light intensity in an optical axis is set to 1. The horizontal axis represents a distance from the optical axis.

The collimator lens unit 20c according to Comparative Example 1 basically has the same configuration as the collimator lens unit 20a according to the second embodiment, but is different from the collimator lens unit 20a according to the second embodiment in the configuration of the second lens constituting the collimator lens unit 20c.

That is, in the collimator lens unit 20c according to Comparative Example 1, the second lens 24c is formed of a convex meniscus lens in which a spherical face is formed in the incidence face 25c and an aspheric face is formed in the emission face 26c, as shown in FIG. 6A.

In the collimator lens unit 20c according to Comparative Example 1, a front aspheric face is not formed in any one of the emission face (spherical face) 23c of the first lens 22c and the incidence face (spherical face) 25c of the second lens 24c constituting the collimator lens unit 20c. Accordingly, similarly to the case where the past collimator lens unit is applied to the past projector, the luminous flux density in the vicinity of the optical axis of the collimator lens unit 20c in the beam of light emitted from the collimator lens unit 20c is lower than the luminous flux density in the peripheral portion separated from the optical axis of the collimator lens unit 20c (see FIGS. 6B and 6C). For this reason, even when an integrator optical system for homogenizing the in-plane light intensity distribution of the beam of light emitted from the collimator lens unit is disposed at the rear stage, the ratio of light applied at a large angle to light applied to an illumination area increases. As a result, in a projector employing particularly a liquid crystal device having a micro lens built therein as an optical modulator, there is a problem in that the light use efficiency decreases due to the increase in ratio of the light applied at a large angle to the light applied to the illumination area.

Comparative Example 2

FIGS. 7A to 7C are diagrams illustrating the collimator lens unit 20d according to Comparative Example 2. FIG. 7A illustrates a state where a beam of light emitted from the solid-state light source unit 10 is substantially collimated by the collimator lens unit 20d, FIG. 7B is a graph illustrating a relative light intensity (relative luminous flux density) of a beam of light emitted from the collimator lens unit 20d, and FIG. 7C illustrates an in-plane light intensity distribution (luminous flux density distribution) of the beam of light emitted from the collimator lens unit 20d. The beam of light shown in FIG. 7A shows a state where the beam of light emitted from the solid-state light source unit 10 is substantially collimated by the collimator lens unit 20d, but does not reflect the luminous flux density. In FIG. 7B, the vertical axis represents the relative light intensity of the beam of light emitted from the collimator lens unit 20d, where the light intensity in an optical axis is set to 1. The horizontal axis represents a distance from the optical axis.

The collimator lens unit 20d according to Comparative Example 2 basically has the same configuration as the collimator lens unit 20c according to Comparative Example 1, but is different from the collimator lens unit 20c according to Comparative Example in the configuration of the second lens constituting the collimator lens unit 20d.

That is, in the collimator lens unit 20d according to Comparative Example 2, the second lens 24d is formed of an aspheric convex meniscus lens in which an aspheric face is formed in the incidence face 25d and a rear aspheric face is formed in the emission face 26d, as shown in FIG. 7A.

However, in the collimator lens unit 20d according to Comparative Example 2, the incidence face (aspheric face) 25d of the second lens 24d constituting the collimator lens unit 20d does not have the luminous flux density distribution changing function of changing the luminous flux density distribution of the beam of light emitted from the solid-state light source unit 10 to a predetermined luminous flux density distribution in which the luminous flux density in the vicinity of the optical axis of the collimator lens unit 20d is higher than the luminous flux density in the peripheral portion apart from the optical axis of the collimator lens unit 20d. Accordingly, similarly to the case where the past collimator lens unit is applied to the past projector, the luminous flux density in the vicinity of the optical axis of the collimator lens unit 20d in the beam of light emitted from the collimator lens unit 20d is lower than the luminous flux density in the peripheral portion separated from the optical axis of the collimator lens unit 20d (see FIGS. 7B and 7C). For this reason, even when an integrator optical system for homogenizing the in-plane light intensity distribution of the beam of light emitted from the collimator lens unit is disposed at the rear stage, the ratio of light applied at a large angle to light applied to an illumination area increases. As a result, in a projector employing particularly a liquid crystal device having a micro lens built therein as an optical modulator, there is a problem in that the light use efficiency decreases due to the increase in ratio of the light applied at a large angle to the light applied to the illumination area.

Comparative Example 3

FIGS. 8A to 8C are diagrams illustrating the collimator lens unit 20e according to Comparative Example 3. FIG. 8A illustrates a state where a beam of light emitted from the solid-state light source unit 10 is substantially collimated by the collimator lens unit 20e, FIG. 8B is a graph illustrating a relative light intensity (relative luminous flux density) of a beam of light emitted from the collimator lens unit 20e, and FIG. 8C illustrates an in-plane light intensity distribution (luminous flux density distribution) of the beam of light emitted from the collimator lens unit 20e. The beam of light shown in FIG. 8A shows a state where the beam of light emitted from the solid-state light source unit 10 is substantially collimated by the collimator lens unit 20e, but does not reflect the luminous flux density. In FIG. 8B, the vertical axis represents the relative light intensity of the beam of light emitted from the collimator lens unit 20e, where the light intensity in an optical axis is set to 1. The horizontal axis represents a distance from the optical axis.

The collimator lens unit 20e according to Comparative Example 3 basically has the same configuration as the collimator lens unit 20d according to Comparative Example 2, but is different from the collimator lens unit 20d according to Comparative Example in the configuration of the second lens constituting the collimator lens unit 20e.

That is, in the collimator lens unit 20e according to Comparative Example 3, the second lens 24e is formed of an aspheric double-convex lens in which an aspheric face is formed in the incidence face 25e and a rear aspheric face is formed in the emission face 26e, as shown in FIG. 8A.

However, in the collimator lens unit 20e according to Comparative Example 3, since the incidence face (aspheric face)

25e of the second lens 24e constituting the collimator lens unit 20e has the luminous flux density distribution changing function of changing the luminous flux density distribution of the beam of light emitted from the solid-state light source unit 10 to a predetermined luminous flux density distribution in which the luminous flux density in the vicinity of the optical axis of the collimator lens unit 20e is higher than the luminous flux density in the peripheral portion apart from the optical axis of the collimator lens unit 20e but the performance is not satisfactory. Thus, regarding the beam of light emitted from the collimator lens unit, the luminous flux density in the vicinity of the optical axis of the collimator lens unit cannot be made to be higher than the luminous flux density in the peripheral portion separated from the optical axis of the collimator lens unit. Accordingly, similarly to the case where the past collimator lens unit is applied to the past projector, the luminous flux density in the vicinity of the optical axis of the collimator lens unit 20e in the beam of light emitted from the collimator lens unit 20e is lower than the luminous flux density in the peripheral portion separated from the optical axis of the collimator lens unit 20e (see FIGS. 8B and 8C). For this reason, even when an integrator optical system for homogenizing the in-plane light intensity distribution of the beam of light emitted from the collimator lens unit is disposed at the rear stage, the ratio of light applied at a large angle to light applied to an illumination area increases. As a result, in a projector employing particularly a liquid crystal device having a micro lens built therein as an optical modulator, there is a problem in that the light use efficiency decreases due to the increase in ratio of the light applied at a large angle to the light applied to the illumination area.

Comparative Example 4

FIGS. 9A to 9C are diagrams illustrating the collimator lens unit 20f according to Comparative Example 4. FIG. 9A illustrates a state where a beam of light emitted from the solid-state light source unit 10 is bent at the time of passing through the collimator lens unit 20f, FIG. 9B is a graph illustrating a relative light intensity (relative luminous flux density) of a beam of light emitted from the collimator lens unit 20f, and FIG. 9C illustrates an in-plane light intensity distribution (luminous flux density distribution) of the beam of light emitted from the collimator lens unit 20f. The beam of light shown in FIG. 9A shows a state where the beam of light emitted from the solid-state light source unit 10 is bent at the time of passing through the collimator lens unit 20f, but does not reflect the luminous flux density. In FIG. 9B, the vertical axis represents the relative light intensity of the beam of light emitted from the collimator lens unit 20f, where the light intensity in an optical axis is set to 1. The horizontal axis represents a distance from the optical axis.

The collimator lens unit 20f according to Comparative Example 4 basically has the same configuration as the collimator lens unit 20c according to Comparative Example 1, but is different from the collimator lens unit 20c according to Comparative Example in the configuration of the second lens constituting the collimator lens unit 20f.

That is, in the collimator lens unit 20f according to Comparative Example 4, the second lens 24f is formed of a convex meniscus lens in which a spherical face is formed in the incidence face 25f and the emission face 26f, as shown in FIG. 9A.

In this way, in the collimator lens unit 20f according to Comparative Example 4, the front aspheric face is not formed in any of the emission face 23f of the first lens 22f and the incidence face 25f of the second lens 24f and the rear aspheric face is not formed in the emission face 26f of the second lens 24f. Accordingly, as shown in FIGS. 9B and 9C, in the beam of light emitted from the collimator lens unit 20f, the luminous flux density in the peripheral portion separated from the optical axis of the collimator lens unit 20f is high. As shown in FIG. 9A, the beam of light emitted from the solid-state light source unit 10 cannot be substantially collimated. As a result, in the beam of light emitted from the collimator lens unit 20f, the luminous flux density in the vicinity of the optical axis of the collimator lens unit 20f can be made to be higher than the luminous flux density in the peripheral portion separated from the optical axis of the collimator lens unit 20f, but the beam of light emitted from the solid-state light source unit 10 cannot be substantially collimated.

An illuminating device and a projector according to another embodiment of the invention employing the collimator lens unit according to the invention will be described below.

Fourth Embodiment

Figure 10:
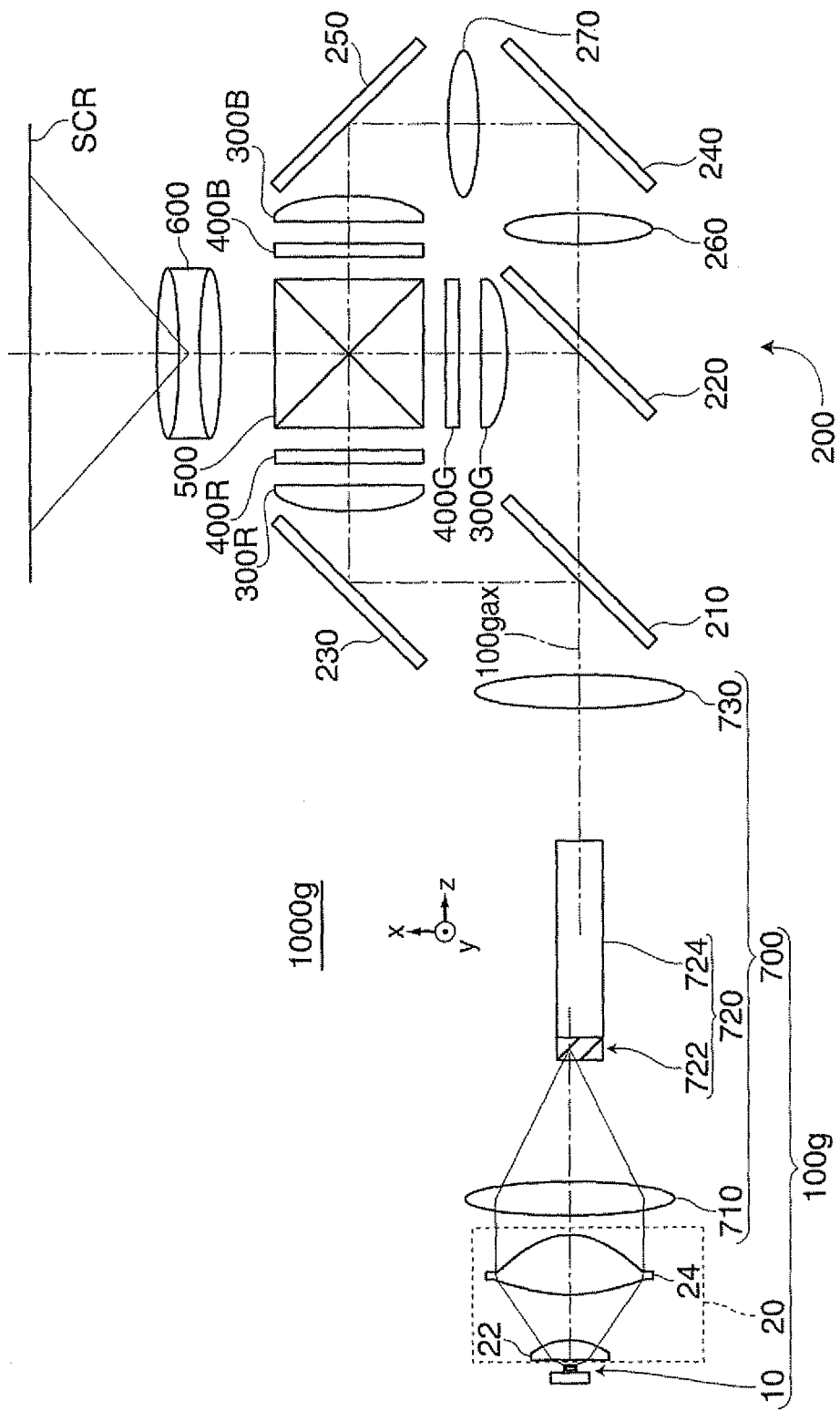
FIG. 10 is a diagram illustrating an illuminating device and a projector according to a fourth embodiment of the invention.

FIG. 10 is a diagram illustrating an illuminating device 100g and a projector 1000g according to a fourth embodiment of the invention.

The projector 1000g according to the fourth embodiment of the invention basically has the same configuration as the projector 1000 according to the first embodiment, but is different from the projector 1000 according to the first embodiment in the configuration of the illuminating device.

That is, as shown in FIG. 10, the illuminating device 100g according to the fourth embodiment includes a rod integrator optical system 700 as the integrator optical system. The same elements as the illuminating device 100 according to the first embodiment will not be described.

The rod integrator optical system 700 includes a collecting lens 710, a polarization changing rod 720, and a relay lens 730.

The collecting lens 710 collects the collimated beam of light from the collimator lens unit 20 and guides the collected beam of light to the polarization changing portion 722 of the polarization changing rod 720.

The polarization changing rod 720 includes a polarization changing portion 722 and an integrator rod portion 724 and emits a beam of light of which the in-plane light intensity distribution is homogeneous. The polarization changing portion 722 has a function of changing the beam of light from the collecting lens 710 to one kind of linearly-polarized light. The integrator rod portion 724 has a function of homogenizing the polarization-changed light by multiply reflecting the light by the use of the inner face.

The relay lens 730 has a function of forming the beam of light emitted from the polarization changing rod 720 in the vicinity of the image forming areas of the liquid crystal devices 400R, 400G, and 400B without spreading the beam of light in cooperation with the collecting lenses 300R, 300G, and 300B. The relay lens 730 may be formed of a complex lens in which plural lenses are combined.

Since the illuminating device 100g according to the fourth embodiment includes the solid-state light source unit 10 of a Lambert emission type and the collimator lens unit 20 substantially collimating the beam of light emitted from the solid-state light source unit 10, the light use efficiency does not decrease due to the increase in ratio of the beam of light applied at a large angle to the beam of light applied to the illumination area, similarly to the illuminating device 100 according to the first embodiment.

Since the projector 1000g according to the fourth embodiment includes the illuminating device 100g, it is possible to provide a projector with a high light use efficiency in which the light use efficiency does not decrease due to the increase in ratio of the beam of light applied at a large angle to the beam of light applied to the illumination area.

Since the projector 1000g according to the fourth embodiment has the same configuration as the projector 1000 according to the first embodiment except for the configuration of the illuminating device, it is possible to obtain the corresponding advantages out of the advantages of the projector 1000 according to the first embodiment.

Fifth Embodiment

Figure 11A:
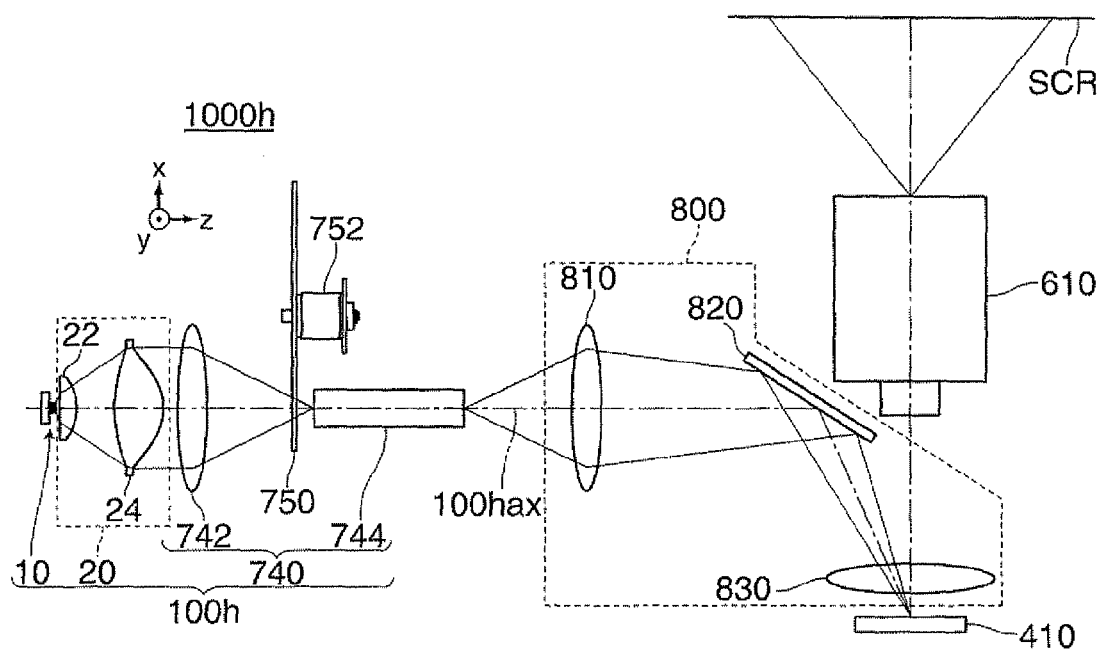
FIGS. 11A and 11B are diagrams illustrating an illuminating device and a projector according to a fifth embodiment of the invention.
Figure 11B:
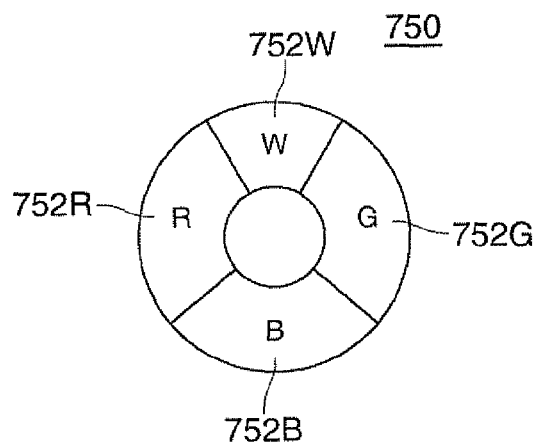

FIGS. 11A and 11B are diagrams illustrating an illuminating device 100h and a projector 1000h according to the fifth embodiment of the invention, where FIG. 11A is a plan view of the optical system of the projector 1000h and FIG. 11B is a diagram illustrating a color wheel 750.

The projector 1000h according to the fifth embodiment includes an illuminating device 100h, a relay optical system 800, a micro mirror type optical modulator 410, and a projection optical system 610 as shown in FIG. 11A.

The illuminating device 100h includes a solid-state light source unit 10, a collimator lens unit 20, a rod integrator optical system 740, and a color wheel 750.

The solid-state light source unit 10 and the collimator lens unit 20 are the same as described in the first embodiment and thus will not be described again.

The rod integrator optical system 740 includes a collecting lens 742 and an integrator rod 744. The collecting lens 742 collects and guides the collimated beam of light from the collimator lens unit 20 to the incidence face of the integrator rod 744. The integrator rod 744 homogenizes the beam of light incident on the incidence face by multiply reflecting the beam of light by the use of the inner face and emits a beam of light of which the in-plane light intensity distribution is homogeneous.

The color wheel 750 is disposed just before the incidence face of the integrator rod 744, as shown in FIG. 11A. As shown in FIG. 11B, the color wheel 750 is a disc-like member in which three transmissive color filters 752R, 752G, and 752B and a transparent area 752W are formed in four fan-shaped areas partitioned in the rotational direction.

The color filter 752R transmits only the red light component by transmitting the light of a red wavelength out of the beam of light incident on the integrator rod 744 and reflecting or absorbing the light of other wavelengths. Similarly, the color filters 752G and 752B transmit only the green light component and blue light component by transmitting the light of the green and blue wavelengths out of the beam of light incident on the integrator rod 744 and reflecting or absorbing the light of the other wavelength, respectively. The color filters 752R, 752G, and 752B can suitably employ, for example, a multi-layered dielectric film or a filter plate formed out of dyes. The transparent area 752W can transmit the beam of light incident on the integrator rod 744 without any change. By using this transparent area 752W, it is possible to increase the luminance of the projection image and guarantee the brightness of the projection image.

The relay optical system 800 includes a relay lens 810, a reflecting mirror 820, and a collecting lens 830 as shown in FIG. 11A and has a function of guiding the beam of light from the integrator rod 744 to the image forming area of the micro mirror type optical modulator 410.

The relay lens 810 has a function of focusing the beam of light from the integrator rod 744 on the vicinity of the image forming area of the micro mirror type optical modulator 410 without spreading the beam of light in cooperation with the collecting lens 830. The relay lens 810 may be formed of a single lens or may be formed of a complex lens in which plural lenses are combined.

The reflecting mirror 820 is disposed oblique about the illumination optical axis 100hax, bends the beam of light from the relay lens 810, and guides the bent beam of light to the micro mirror type optical modulator 410. Accordingly, it is possible to make the projector compact.

The collecting lens 830 collects the beam of light from the relay lens 810 and the reflecting mirror 820 on the image forming area of the micro mirror type optical modulator 410 and enlarges and projects the beam of light modulated by the micro mirror type optical modulator 410 in cooperation with the projection optical system 610.

The micro mirror type optical modulator 410 is a reflecting direction-controlled optical modulator having a function of emitting a beam of image light representing an image to the projection optical system 610 by reflecting the beam of light from the relay optical system 800 by the use of micro mirrors corresponding to pixels on the basis of the image information. For example, DMD (Digital Micro-mirror Device) (trademark of Texas Instruments Incorporated) can be used as the micro mirror type optical modulator 410.

The image light emitted from the micro mirror type optical modulator 410 is enlarged and projected by the projection optical system 610 to form an image on a screen SCR.

Since the illuminating device 100h according to the fifth embodiment includes the solid-state light source unit 10 of a Lambert emission type and the collimator lens unit 20 substantially collimating the beam of light emitted from the solid-state light source unit 10, the light use efficiency does not decrease due to the increase in ratio of the light applied at a large angle to the light applied to the illumination area, similarly to the illuminating device 100 according to the first embodiment.

Since the projector 1000h according to the fifth embodiment includes the illuminating device 100h, it is possible to provide a projector with a high light use efficiency in which the light use efficiency does not decrease due to the increase in ratio of the beam of light applied at a large angle to the beam of light applied to the illumination area.

Sixth Embodiment

FIGS. 12A to 12C are diagrams illustrating the collimator lens unit 20i according to the sixth embodiment. FIG. 12A illustrates a state where a beam of light emitted from the solid-state light source unit 10 is substantially collimated by the collimator lens unit 20i, FIG. 12B is a graph illustrating a relative light intensity (relative luminous flux density) of a beam of light emitted from the collimator lens unit 20i, and FIG. 12C illustrates an in-plane light intensity distribution (luminous flux density distribution) of the beam of light emitted from the collimator lens unit 20i. The beam of light shown in FIG. 12A shows a state where the beam of light emitted from the solid-state light source unit 10 is substantially collimated by the collimator lens unit 20i, but does not reflect the luminous flux density. In FIG. 12B, the vertical axis represents the relative light intensity of the beam of light emitted from the collimator lens unit 20i, where the light intensity in an optical axis is set to 1. The horizontal axis represents a distance from the optical axis.

The collimator lens unit 20i according to the sixth embodiment of the invention basically has the same configuration as the collimator lens unit 20 according to the first embodiment, but is different from the collimator lens unit 20 according to the first embodiment, in that it further includes a third lens.

That is, in the collimator lens unit 20i according to the sixth embodiment, at least two lenses include a first lens 22i located close to the solid-state light source unit 10, a second lens 24i located apart from the solid-state light source unit 10, and a third lens 28 located between the first lens 22i and the second lens 24i, as shown in FIG. 12A, a front aspheric face is formed in two faces of the emission face 23i of the first lens 22i and the incidence face 27 of the third lens 28, and a rear aspheric face is formed in the emission face 26i of the second lens 24i. The incidence face 21i of the first lens 22i, the incidence face 25i of the second lens 24i, and the emission face 29 of the third lens 28 are formed of a plane.

The invention is not limited to the above-mentioned configuration, but a front aspheric face may be formed particularly in the emission face of the third lens or the incidence face of the second lens.

In this way, the collimator lens unit 20i according to the sixth embodiment is different from the collimator lens unit 20 according to the first embodiment, in that it further includes the third lens 28, but the front aspheric faces formed in the emission face 23i of the first lens 22i and the incidence face 27 of the third lens 28 have a function of converting the beam of light from the solid-state light source unit 10 into a beam of light in which the luminous flux density in the vicinity of the optical axis of the collimator lens unit 20i is higher than the luminous flux density in the peripheral portion separated from the optical axis of the collimator lens unit 20i and emitting the resultant beam of light. Accordingly, as shown in FIGS. 12B and 12C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20 according to the first embodiment.

In the collimator lens unit 20i according to the sixth embodiment of the invention, the front aspheric faces are formed in two faces of the emission face 23i of the first lens 22i and the incidence face 27 of the third lens 28 and the rear aspheric face is formed in the emission face 26i of the second lens 24i. Accordingly, the luminous flux density in the vicinity of the optical axis of the collimator lens unit out of the luminous flux density of the beam of light emitted from the solid-state light source unit can be reasonably made to satisfactorily be higher than the luminous flux density in the peripheral portion separated from the optical axis of the collimator lens unit.

Seventh Embodiment

Figure 13:
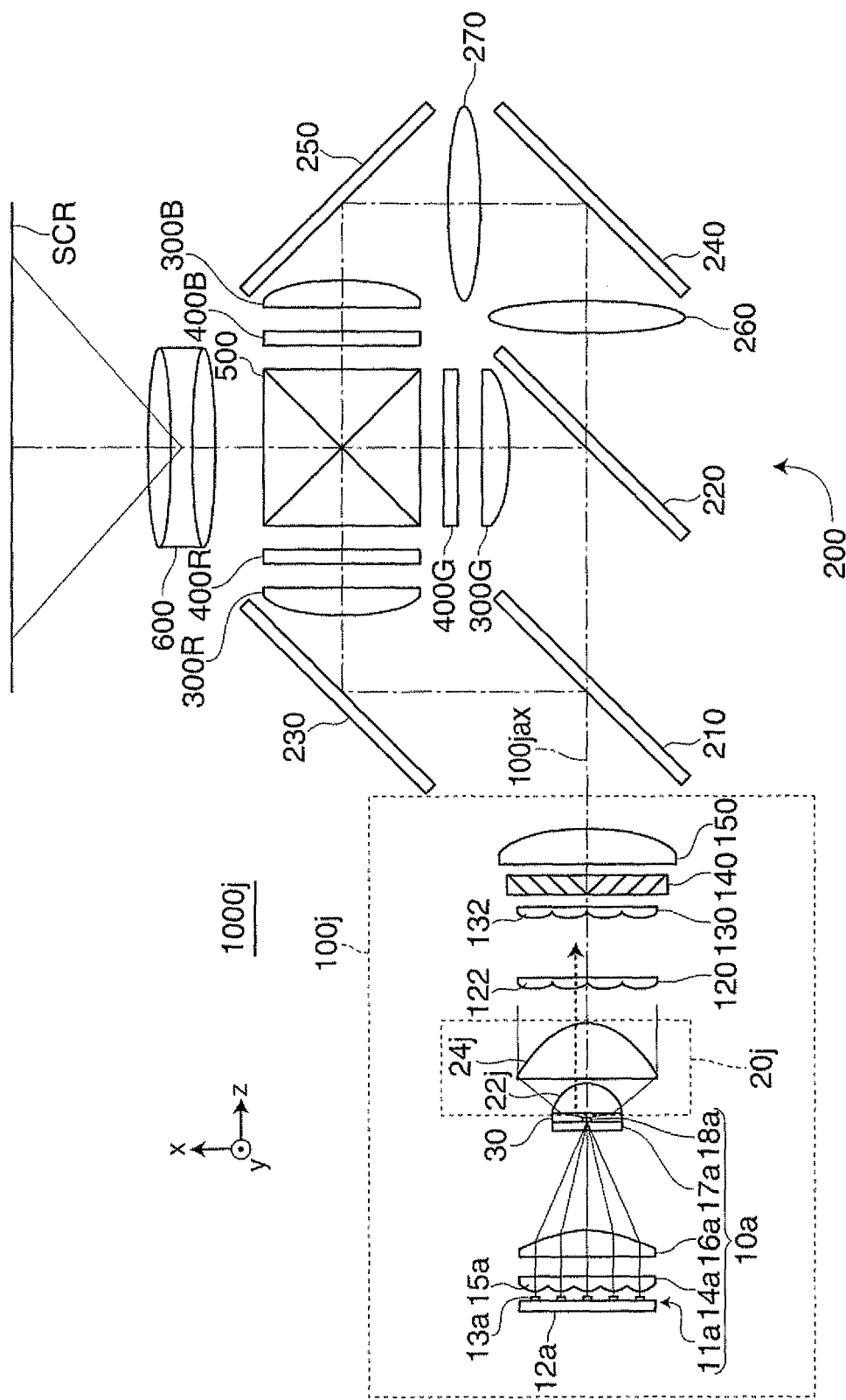
FIG. 13 is a plan view illustrating an optical system of a projector according to a seventh embodiment of the invention.

FIG. 13 is a plan view illustrating an optical system of a projector 1000j according to a seventh embodiment of the invention.

Figure 14:
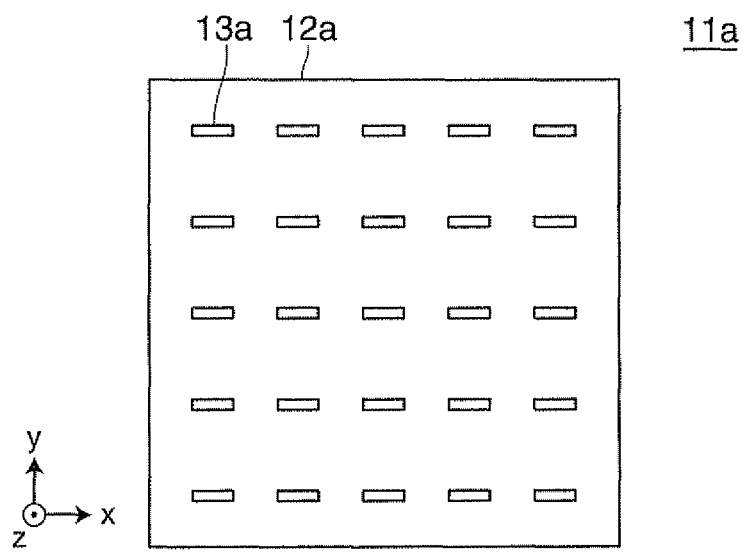
FIG. 14 is a diagram illustrating a solid-state light source array according to the seventh embodiment of the invention as viewed from a collimator lens array.

FIG. 14 is a diagram illustrating a solid-state light source array 11a according to the seventh embodiment of the invention as viewed from a collimator lens array 14a.

FIGS. 15A to 15C are diagrams illustrating a collimator lens unit 20j and an illuminating device 100j (in which reference numerals are not shown) according to the seventh embodiment. FIG. 15A illustrates a state where a beam of light emitted from the solid-state light source unit 10a (in which only a transparent substrate 17a and a fluorescent layer 18a are shown) is substantially collimated by the collimator lens unit 20j, FIG. 15B is a graph illustrating a relative light intensity (relative luminous flux density) of a beam of light emitted from the collimator lens unit 20j, and FIG. 15C illustrates an in-plane light intensity distribution (luminous flux density distribution) of the beam of light emitted from the collimator lens unit 20j. The beam of light shown in FIG. 15A shows a state where the beam of light emitted from the solid-state light source unit 10a is substantially collimated by the collimator lens unit 20j, but does not reflect the luminous flux density. In FIG. 15B, the vertical axis represents the relative light intensity of the beam of light emitted from the collimator lens unit 20j, where the light intensity in an optical axis is set to 1. The horizontal axis represents a distance from the optical axis.

The illuminating device 100j according to the seventh embodiment basically has the same configuration as the illuminating device 100 according to the first embodiment, but is different from the illuminating device 100 according to the first embodiment, in that it further includes a heat-dissipating member. The configurations of the solid-state light source unit and the collimator lens unit (the first lens and the second lens) are also different based on the heat-dissipating member. The configuration of the illuminating device 100j according to the seventh embodiment will be described below.

The illuminating device 100j according to the seventh embodiment includes a solid-state light source unit 10a, a collimator lens unit 20j, a first lens array 120, a second lens array 130, a polarization changing element 140, and a superposing lens 150, as shown in FIG. 13. In the illuminating device 100j, the heat-dissipating member 30 is disposed in contact with the fluorescent layer 18a (to be described later) and the first lens 22j (to be described later).

The solid-state light source unit 10a is a solid-state light source unit of a Lambert emission type including a solid-state light source array 11a, a collimator lens array 14a, a light-collecting optical system 16a, a transparent substrate 17a, and a fluorescent layer 18a, and emits white light including red light, green light, and blue light. The solid-state light source unit 10a includes lead lines and the like in addition to the above-mentioned elements, which will not be shown and described.

The solid-state light source array 11a includes a substrate 12a and 25 solid-state light sources 13a as shown in FIG. 14. In the solid-state light source array 11a, the 25 solid-state light sources 13a are arranged in a matrix shape of 5 rows and 5 columns. In FIG. 14, only the left-upper solid-state light source 13a is referenced by a reference numeral.

The solid-state light source 13a is formed of a semiconductor laser generating blue light as exciting light. The semiconductor laser has a rectangular light-emitting area as shown in FIG. 14.

The collimator lens array 14a includes plural collimator lenses 15a (of which only one is referenced by a reference numeral) which are disposed to correspond to the 25 solid-state light sources 13a and which substantially collimate the beam of light generated from the 25 solid-state light sources 13a. Although not shown and described, the collimator lenses 15a are arranged in a matrix shape of 5 rows and 5 columns. Each collimator lens 15a is formed of, for example, an aspheric plano-convex lens of which the incidence face is a hyperboloid and the emission face is a plane.

The collecting optical system 16a collects the blue light (exciting light from the 25 solid-state light sources 13a) from the collimator lens array 14a to a predetermined collection position. The collecting optical system 16a is formed of, for example, an aspheric plano-convex lens of which the incidence face is a plane and the emission face is a hyperboloid.

In the embodiment of the invention, the number and shape of lenses constituting the collimator lens array or the collecting optical system is not limited to the above-mentioned description.

The transparent substrate 17a is a member holding the fluorescent layer 18a and is formed of, for example, quartz glass or optical glass.

The fluorescent layer 18a is located in the vicinity of the predetermined collection position and generates and emits fluorescent light including red light and green light from a part of the blue light from the collecting optical system 16a. The fluorescent layer 18a is a light-emitting portion in the solid-state light source unit 10a.

The heat-dissipating member 30 is formed of sapphire (with nd=1.71) which is a transparent solid. The face of the heat-dissipating member 30 in contact with the incidence face 21j (to be described later) of the first lens 22j (to be described later) is a plane.

The collimator lens unit 20j basically has the same configuration as the collimator lens unit 20 according to the first embodiment, but is different from the collimator lens unit 20 according to the first embodiment, in the configuration of the first lens and the configuration of the second lens. Accordingly, in the following description, the same elements of the collimator lens unit 20j as the collimator lens unit 20 will not described.

As shown in FIGS. 13 and 15A, the collimator lens unit 20j includes a first lens 22j located close to the solid-state light source unit 10a and a second lens 24j located apart from the solid-state light source unit 10a.

The first lens 22j is an aspheric plano-convex lens of which the incidence face 21j is a plane and the emission face 23j is formed with a front aspheric face formed of an ellipse-approximating curve of which the minor axis is parallel to the optical axis. The first lens 22j is formed of high-refractive optical glass (with nd=2.07). Accordingly, the illuminating device 100j satisfies the condition of "n2−n1≥0.2", where n1 represents the nd of the heat-dissipating member 30 and n2 represents the nd of the first lens 22j.

The second lens 24j is an aspheric plano-convex lens of which the incidence face 25j is a plane and the emission face 26j is a rear aspheric face and which is formed of high-refractive optical glass (with nd=1.70).

The first lens array 120, the second lens array 130, the polarization changing element 140, and the superposing lens 150 are the same as described in the first embodiment and thus are not described again.

In this way, the collimator lens unit 20j according to the seventh embodiment is different from the collimator lens unit 20 according to the first embodiment, in the configuration of the first lens 22j and the configuration of the second lens 24j, but the front aspheric face formed in the emission face 23j of the first lens 22j has the function of converting the beam of light from the solid-state light source unit 10a into a beam of light in which the luminous flux density in the vicinity of the optical axis of the collimator lens unit 20j is higher than the luminous flux density in the peripheral portion separated from the optical axis of the collimator lens unit 20j and emitting the resultant beam of light. Accordingly, as shown in FIGS. 15B and 15C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20 according to the first embodiment.

The illuminating device 100j according to the seventh embodiment is different from the illuminating device 100 according to the first embodiment, in that it further includes the heat-dissipating member 30, but includes the solid-state light source unit 10a of a Lambert emission type and the collimator lens unit 20j according to the seventh embodiment substantially collimating the beam of light emitted from the solid-state light source unit 10a. Accordingly, similarly to the illuminating device 100 according to the first embodiment, the light use efficiency does not decrease due to the increase in ratio of the beam of light applied at a large angle to the beam of light applied to the illumination area.

In the illuminating device 100j according to the seventh embodiment, since the heat-dissipating member 30 formed of a transparent solid is disposed in contact with the light-emitting portion (the fluorescent layer 18a) and the first lens 22j, it is possible to cool the light-emitting portion, which can be easily heated to a high temperature, using the heat-dissipating member 30 and thus to prevent the deterioration of the light-emitting portion, thereby elongating the lifetime of the illuminating device.

In the illuminating device 100j according to the seventh embodiment, since the heat-dissipating member 30 is disposed in contact with the first lens 22j, only the interface between the heat-dissipating member 30 and the first lens 22j in the optical path from the solid-state light source unit 10a to the first lens 22j can be considered for the refraction of light. Accordingly, it is possible to easily design the illuminating device.

In the illuminating device 100j according to the seventh embodiment, since the front aspheric face is formed in the emission face 23j of the first lens 22j, it is possible to form coarse and dense portions in the luminous flux emitted from the first lens 22j.

In the illuminating device 100j according to the seventh embodiment, since the distance from the front aspheric face to the rear aspheric face can increase more in comparison with the case where the front aspheric face is formed in the incidence face of the second lens, it is possible to reasonably and precisely change the luminous flux density distribution over the greater distance.

In the illuminating device 100j according to the seventh embodiment, the front aspheric face is an ellipse-approximating curve of which the minor axis is parallel to the optical axis. Accordingly, regarding the luminous flux density of the beam of light emitted from the solid-state light source unit 10a, the luminous flux density in the vicinity of the optical axis of the collimator lens unit 20j can be set to be higher than the luminous flux density in the peripheral portion separated from the optical axis of the collimator lens unit 20j.

In the illuminating device 100j according to the seventh embodiment, the condition of "n2−n1≥0.2" is satisfied, where n1 represents the nd of the heat-dissipating member 30 and n2 represents the nd of the first lens 22j. Accordingly, it is possible to satisfactorily refract the beam of light in the interface between the heat-dissipating member 30 and the first lens 22j.

In the illuminating device 100j according to the seventh embodiment, since the heat-dissipating member 30 is formed of a solid, the face of the heat-dissipating member 30 in contact with the incidence face 21j of the first lens 22j is a plane, and the incidence face 21j of the first lens 22j is a plane, it is possible to reduce the costs of the heat-dissipating member 30 and the first lens 22j, thereby reducing the manufacturing cost of the illuminating device.

In the illuminating device 100j according to the seventh embodiment, it is possible to easily bring the heat-dissipating member 30 into close contact with the first lens 22j. From this point of view, it is possible to reduce the manufacturing cost of the illuminating device.

Eighth Embodiment

Figure 16A:
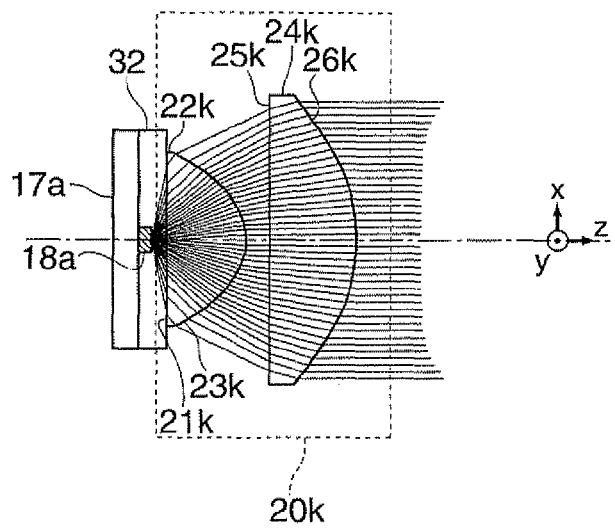
Figure 16A:
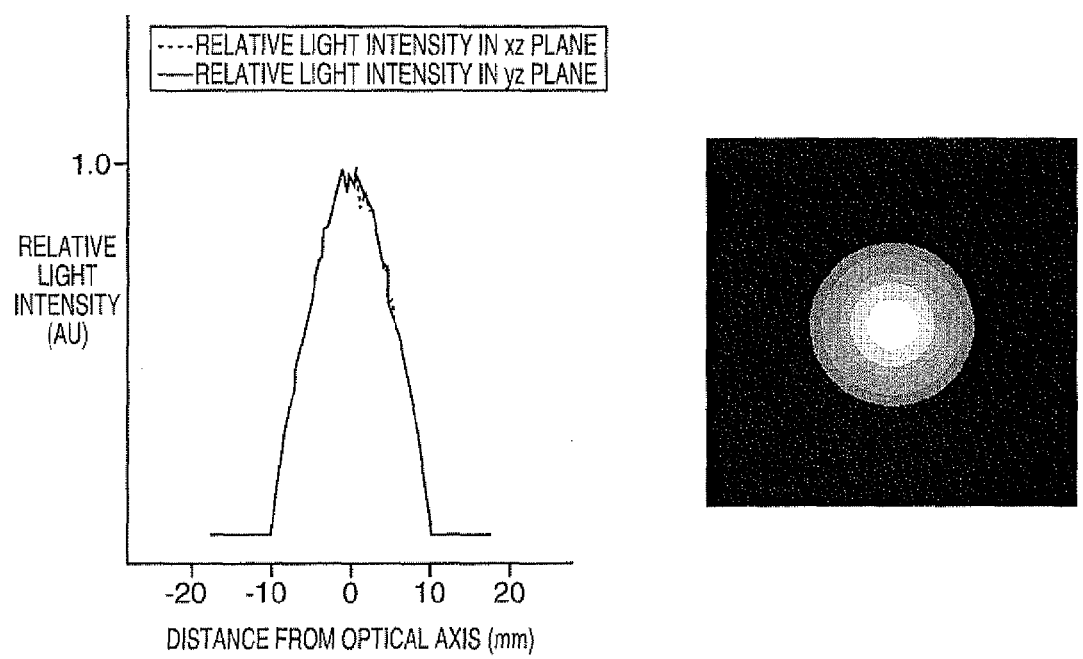

FIGS. 16A to 16C are diagrams illustrating a collimator lens unit 20k and an illuminating device 100k (in which reference numerals are not shown) according to the eighth embodiment. FIG. 16A illustrates a state where a beam of light emitted from the solid-state light source unit 10a (in which only a transparent substrate 17a and a fluorescent layer 18a are shown) is substantially collimated by the collimator lens unit 20k, FIG. 16B is a graph illustrating a relative light intensity (relative luminous flux density) of a beam of light emitted from the collimator lens unit 20k, and FIG. 16C illustrates an in-plane light intensity distribution (luminous flux density distribution) of the beam of light emitted from the collimator lens unit 20k. The beam of light shown in FIG. 16A shows a state where the beam of light emitted from the solid-state light source unit 10a is substantially collimated by the collimator lens unit 20k, but does not reflect the luminous flux density. In FIG. 16B, the vertical axis represents the relative light intensity of the beam of light emitted from the collimator lens unit 20k, where the light intensity in an optical axis is set to 1. The horizontal axis represents a distance from the optical axis.

The illuminating device 100k (of which the reference numeral is not shown) according to the eighth embodiment basically has the same configuration as the illuminating device 100j according to the seventh embodiment, but is different from the illuminating device 100j according to the seventh embodiment, in the configurations of the heat-dissipating member and the collimator lens unit (the first lens and the second lens).

That is, in the illuminating device 100k according to the eighth embodiment, the heat-dissipating member 32 is formed of quartz glass (with nd=1.46) and the first lens 22k of the collimator lens unit 20k is formed of high-refractive optical glass (with nd=2.07). Accordingly, as shown in FIG. 16A, the shapes of the emission face (front aspheric face) 23k of the first lens 22k and the emission face (rear aspheric face) 26k of the second lens 24k are different from those of the illuminating device 100j according to the seventh embodiment.

In this way, the collimator lens unit 20k according to the eighth embodiment is different from the collimator lens unit 20j according to the seventh embodiment, in the configuration of the first lens 22k and the configuration of the second lens 24k, but the front aspheric face formed in the emission face 23k of the first lens 22k has the function of converting the beam of light from the solid-state light source unit 10a into a beam of light in which the luminous flux density in the vicinity of the optical axis of the collimator lens unit 20k is higher than the luminous flux density in the peripheral portion separated from the optical axis of the collimator lens unit 20k and emitting the resultant beam of light. Accordingly, as shown in FIGS. 16B and 16C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20j according to the seventh embodiment.

The illuminating device 100k according to the eighth embodiment is different from the illuminating device 100j according to the seventh embodiment, in the configurations of the heat-dissipating member 32 and the collimator lens unit 20k (the first lens 22k and the second lens 24k), but includes the solid-state light source unit 10a of a Lambert emission type and the collimator lens unit 20k according to the eighth embodiment substantially collimating the beam of light emitted from the solid-state light source unit 10a. Accordingly, similarly to the illuminating device 100j according to the seventh embodiment, the light use efficiency does not decrease due to the increase in ratio of the beam of light applied at a large angle to the beam of light applied to the illumination area.

Since the illuminating device 100k according to the eighth embodiment has the same configuration as the illuminating device 100j according to the seventh embodiment except for the configurations of the heat-dissipating member and the collimator lens unit (the first lens and the second lens), it is possible to obtain the corresponding advantages out of the advantages of the illuminating device 100j according to the seventh embodiment.

Ninth Embodiment

FIGS. 17A to 17C are diagrams illustrating collimator lens unit 20l and an illuminating device 100l (in which reference numerals are not shown) according to the ninth embodiment. FIG. 17A illustrates a state where a beam of light emitted from the solid-state light source unit 10a (in which only a transparent substrate 17a and a fluorescent layer 18a are shown) is substantially collimated by the collimator lens unit 20l, FIG. 17B is a graph illustrating a relative light intensity (relative luminous flux density) of a beam of light emitted from the collimator lens unit 20l, and FIG. 17C illustrates an in-plane light intensity distribution (luminous flux density distribution) of the beam of light emitted from the collimator lens unit 20l. The beam of light shown in FIG. 17A shows a state where the beam of light emitted from the solid-state light source unit 10a is substantially collimated by the collimator lens unit 20l, but does not reflect the luminous flux density. In FIG. 17B, the vertical axis represents the relative light intensity of the beam of light emitted from the collimator lens unit 20l, where the light intensity in an optical axis is set to 1. The horizontal axis represents a distance from the optical axis.

The illuminating device 100l (of which the reference numeral is not shown) according to the ninth embodiment basically has the same configuration as the illuminating device 100j according to the seventh embodiment, but is different from the illuminating device 100j according to the seventh embodiment, in the configurations of the heat-dissipating member and the collimator lens unit (the first lens and the second lens). In that it further includes a heat-dissipating member holding portion on the basis of the difference of the configurations of the heat-dissipating member and the collimator lens unit, it is different from the illuminating device 100j according to the seventh embodiment.

That is, in the illuminating device 100l according to the ninth embodiment, the heat-dissipating member 34 is formed of water (with nd=1.333) and the first lens 22l of the collimator lens unit 20l is formed of high-refractive optical glass (with nd=1.65). Accordingly, as shown in FIG. 17A, the shapes of the emission face (front aspheric face) 23*l* of the first lens 22*l* and the emission face (rear aspheric face) 26*l* of the second lens 24*l* are different from those of the illuminating device 100*j* according to the seventh embodiment.

Since water is a liquid at a normal temperature (in the range of 5° C. to 35° C.), the illuminating device 100*l* further includes the heat-dissipating member holding portion 40 for holding the heat-dissipating member 34. The heat-dissipating member holding portion 40 is formed of a transparent material (for example, optical glass). The heat-dissipating member holding portion 40 has a space therein and receives the transparent substrate 17*a*, the fluorescent layer 18*a*, and the heat-dissipating member 34 in the space.

A hole for inserting the first lens 22*l* is formed in the heat-dissipating member holding portion 40, and the first lens 22*l* is attached to the heat-dissipating member holding portion 40 with a packing 42 interposed therebetween. Accordingly, as shown in FIG. 17A, the first lens 22*l* is in direct contact with the heat-dissipating member 34 on the incidence face 95*l*.

In this way, the collimator lens unit 20*l* according to the ninth embodiment is different from the collimator lens unit 20*j* according to the seventh embodiment, in the configuration of the first lens 22*l* and the configuration of the second lens 24*l*, but the front aspheric face formed in the emission face 23*l* of the first lens 22*l* has the function of converting the beam of light from the solid-state light source unit 10*a* into a beam of light in which the luminous flux density in the vicinity of the optical axis of the collimator lens unit 20*l* is higher than the luminous flux density in the peripheral portion separated from the optical axis of the collimator lens unit 20*l* and emitting the resultant beam of light. Accordingly, as shown in FIGS. 17B and 17C, regarding the beam of light emitted from the collimator lens unit, since the luminous flux density in the vicinity of the optical axis of the collimator lens unit can be set to be higher than the luminous flux density in the peripheral portion separated from the optical axis of the collimator lens unit, the light use efficiency does not decrease due to the increase in ratio of the beam of light applied at a large angle to the beam of light applied to the illumination area, similarly to the collimator lens unit 20*j* according to the seventh embodiment.

The illuminating device 100*l* according to the ninth embodiment is different from the illuminating device 100*j* according to the seventh embodiment, in the configurations of the heat-dissipating member 34 and the collimator lens unit 20*l* (the first lens 22*l* and the second lens 24*l*), but includes the solid-state light source unit 10*a* of a Lambert emission type and the collimator lens unit 20*l* according to the ninth embodiment substantially collimating the beam of light emitted from the solid-state light source unit 10*a*. Accordingly, similarly to the illuminating device 100*j* according to the seventh embodiment, the light use efficiency does not decrease due to the increase in ratio of the beam of light applied at a large angle to the beam of light applied to the illumination area.

Since the illuminating device 100*l* according to the ninth embodiment has the same configuration as the illuminating device 100*j* according to the seventh embodiment except for the configurations of the heat-dissipating member and the collimator lens unit (the first lens and the second lens), it is possible to obtain the corresponding advantages out of the advantages of the illuminating device 100*j* according to the seventh embodiment.

Although the invention has been described hitherto with reference to the embodiments, the invention is not limited to the embodiments. The invention may be modified in various forms without departing from the concept of the invention and may be modified as follows.

1. Although the front aspheric face is formed in only the incidence face of the second lens in the first, second, fourth, and fifth embodiments of the invention, the invention is not limited to this configuration, the front aspheric face may be formed in only the emission face of the first lens. Although the rear aspheric face is formed in the emission face of the second lens in the seventh to ninth embodiments, the invention is not limited to this configuration. The rear aspheric face may be formed in the incidence face of the second lens.

2. Although the solid-state light source unit emitting white light has been used in the above-mentioned embodiments, the invention is not limited to this configuration. A solid-state light source unit emitting light (for example, light including only monochromatic light such as red light or light including a lot of specific color component) other than the white light may be used.

3. Although the collimator lens unit including two lenses has been used in the seventh to ninth embodiments, the invention is not limited to this configuration. A collimator lens unit including three or more lenses may be used. Although the collimator lens unit including three lenses has been used in the sixth embodiment, the invention is not limited to this configuration. A collimator lens unit including four or more lenses may be used.

4. Although the heat-dissipating member holding portion 40 receiving the transparent substrate 17*a*, the fluorescent layer 18*a*, and the heat-dissipating member 34 therein has been used in the ninth embodiment, the invention is not limited to this configuration. For example, a heat-dissipating member holding portion additionally receiving a "device circulating or agitating the heat-dissipating member" may be used. In this case, it is possible to more strongly cool the light-emitting portion by circulating or agitating the heat-dissipating member formed of a liquid.

5. Although it has been described in the above-mentioned embodiments that the illuminating device according to the invention is applied to the projector, the invention is not limited to this configuration. For example, the illuminating device according to the invention may be applied to other optical instruments (such as an optical disk device, a head lamp of a vehicle, and various illuminating instruments).

6. Although the transmissive projector has been used in the first, fourth, and seventh embodiments, the invention is not limited to this configuration. For example, a reflective projector may be used. Here, the "transmissive" means a type in which an optical modulator as light modulating means transmits light like a transmissive liquid crystal device, and the "reflective" means a type in which an optical modulator as light modulating means reflects light like a reflective liquid crystal device. When the invention is applied to the reflective projector, it is possible to obtain the same advantages as the transmissive projector.

7. Although the projector employing three liquid crystal optical modulators has been described in the first, fourth, and seventh embodiments, the invention is not limited to this configuration. The invention may be applied to a projector employing one, two, or four or more liquid crystal devices.

8. The invention may be applied to a front-projection projector that projects a projection image from a viewing side and a rear-projection projector that projects a projection image from the opposite side of the viewing side.

The entire disclosure of Japanese Patent Application Nos: 2009-291958, filed Dec. 24, 2009 and 2010-247149, filed Nov. 4, 2010 are expressly incorporated by reference herein.

What is claimed is:

1. A collimator lens unit that comprises at least two lenses and substantially collimates a beam of light emitted from a solid-state light source unit of a Lambert emission type,
wherein at least two faces of incidence faces and emission faces of the lenses constituting the at least two lenses are aspheric faces,
at least one front aspheric face located close to the solid-state light source unit out of the at least two aspheric faces has a luminous flux density distribution changing function of changing a luminous flux density distribution of the beam of light emitted from the solid-state light source unit to a predetermined luminous flux density distribution in which the luminous flux density in the vicinity of an optical axis of the collimator lens unit is higher than the luminous flux density in a peripheral portion separated from the optical axis of the collimator lens unit,
the rear aspheric face farthest from the solid-state light source unit out of the at least two aspheric faces has a function of substantially collimating the beam of light formed with the predetermined luminous flux density distribution, and
the luminous flux density in the vicinity of the optical axis of the collimator lens unit in the beam of light emitted from the collimator lens unit is higher than the luminous flux density in a peripheral portion separated from the optical axis of the collimator lens unit.

2. The collimator lens unit according to claim 1, wherein the luminous flux density of the beam of light emitted from the collimator lens unit has the maximum value at the optical axis of the collimator lens unit and gradually becomes lower as it moves away from the optical axis of the collimator lens unit.

3. The collimator lens unit according to claim 1, wherein the at least two lenses include a first lens located closer to the solid-state light source unit and a second lens located apart from the solid-state light source unit, and
the front aspheric face is formed in the emission face of the first lens or the incidence face of the second lens and the rear aspheric face is formed in the emission face of the second lens.

4. The collimator lens unit according to claim 3,
wherein the emission face of the first lens is a spherical face, and
the front aspheric face is formed in the incidence face of the second lens.

5. The collimator lens unit according to claim 4, wherein a gap between the first lens and the second lens is greater than an effective radius of the first lens.

6. The collimator lens unit according to claim 4, wherein the first lens is formed of an optical glass and the second lens is formed of a resin.

7. The collimator lens unit according to claim 6, wherein nd of the first lens is equal to or greater than 1.7.

8. The collimator lens unit according to claim 4, wherein the incidence face of the first lens is a plane.

9. The collimator lens unit according to claim 1,
wherein the at least two lenses include a first lens located closer to the solid-state light source unit, a second lens located apart from the solid-state light source unit, and a third lens located between the first lens and the second lens, and
the front aspheric face is formed in two faces of the emission face of the first lens, the incidence face and the emission face of the third lens, and the incidence face of the second lens and the rear aspheric face is formed in the emission face of the second lens.

10. An illuminating device comprising:
a solid-state light source unit of a Lambert emission type; and
a collimator lens unit that substantially collimates a beam of light emitted from the solid-state light source unit,
wherein the collimator lens unit is the collimator lens unit according to claim 1.

11. The illuminating device according to claim 10,
wherein the collimator lens unit is the collimator lens unit according to claim 1,
the at least two lenses include a first lens located closer to the solid-state light source unit and a second lens located apart from the solid-state light source unit,
when a portion emitting a beam of light having a Lambert light intensity distribution in the solid-state light source unit is a light-emitting portion, a heat-dissipating member formed of a transparent solid or liquid is disposed in contact with the light-emitting portion and the first lens in the illuminating device, and
the front aspheric face is formed in the emission face of the first lens.

12. The illuminating device according to claim 11, wherein the front aspheric face is an ellipse-approximating curve of which the minor axis is parallel to the optical axis.

13. The illuminating device according to claim 11, wherein when nd of the heat-dissipating member is n1 and nd of the first lens is n2, a condition of "n2−n1≥0.2" is satisfied.

14. The illuminating device according to claim 11,
wherein the heat-dissipating member is formed of a solid, and
a face of the heat-dissipating member in contact with the incidence face of the first lens is a plane and the incidence face of the first lens is a plane.

15. A projector comprising an illuminating device, an optical modulator that modulates illuminating light from the illuminating device on the basis of image information, and a projection optical system that projects the modulated light from the optical modulator as a projection image,
wherein the illuminating device is the illuminating device according to claim 10.

* * * * *